United States Patent
Tang et al.

(10) Patent No.: US 9,527,394 B1
(45) Date of Patent: Dec. 27, 2016

(54) TRANSPORTATION SYSTEM OF COMBINED VEHICLES MULTI-COUPLED AT HIGHWAY SPEEDS FOR ELECTRICAL ENERGY TRANSFER AND SHARING

(71) Applicants: Dershuen Allen Tang, Raleigh, NC (US); James Arthur Knopp, Raleigh, NC (US)

(72) Inventors: Dershuen Allen Tang, Raleigh, NC (US); James Arthur Knopp, Raleigh, NC (US)

( * ) Notice: Subject to any disclaimer, the term of this patent is extended or adjusted under 35 U.S.C. 154(b) by 0 days.

(21) Appl. No.: 14/622,846

(22) Filed: Feb. 14, 2015

Related U.S. Application Data

(63) Continuation-in-part of application No. 14/269,072, filed on May 2, 2014, now abandoned.

(60) Provisional application No. 61/818,880, filed on May 2, 2013.

(51) Int. Cl.
    *B60L 11/18*     (2006.01)
    *B60W 10/26*     (2006.01)

(52) U.S. Cl.
    CPC ............ *B60L 11/1818* (2013.01); *B60L 11/18* (2013.01); *B60L 11/1809* (2013.01); *B60W 10/26* (2013.01); *Y02T 10/7266* (2013.01); *Y02T 10/7275* (2013.01); *Y02T 10/7283* (2013.01); *Y02T 90/128* (2013.01); *Y02T 90/168* (2013.01); *Y04S 30/12* (2013.01); *Y04S 30/14* (2013.01); *Y10S 903/907* (2013.01)

(58) Field of Classification Search
    CPC ... B60L 11/1818; B60L 11/18; B60L 11/1809; B60W 10/26; Y02T 90/168; Y02T 90/128; Y02T 10/7266; Y02T 10/7275; Y02T 10/7283; Y04S 30/12; Y04S 30/14; Y10S 903/907

See application file for complete search history.

(56) References Cited

U.S. PATENT DOCUMENTS

| | | | |
|---|---|---|---|
| 2012/0233062 A1* | 9/2012 | Cornish | ................... B25J 11/00 705/39 |
| 2014/0067660 A1* | 3/2014 | Cornish | ............... G06Q 20/145 705/39 |

* cited by examiner

*Primary Examiner* — Russell Frejd

(57) ABSTRACT

The transportation system in this invention provides vehicle coupling units which allow the electrical connections and reconfigurations of two or more vehicles together at highway speeds. The coupling unit provides for the bidirectional exchange of electrical power between these vehicles to meet the various power demands of each vehicle. The system is designed to permit coupling and decoupling process of the vehicles while they are traveling at highway speeds. To facilitate the coupling event, each vehicle will employ vehicle active steering, vehicle active suspension, and coupler joint articulation, which will be under vehicle computer control, and will employ vehicle to vehicle data communication. This transportation system allows the electric vehicles to electrically and mechanically couple together for flexible electrical power sharing to achieve the extension of the range of electrically powered vehicles to minimize the time needed for stationary re-charging of electrical vehicles required by electrical charging stations.

22 Claims, 19 Drawing Sheets

TRANSPORTATION SYSTEM OF COMBINED VEHICLES MULTI-COUPLED AT HIGHWAY SPEEDS FOR ELECTRICAL ENERGY TRANSFER AND SHARING

CROSS-REFERENCE TO RELATED APPLICATIONS

The present application is a Continuation-In-Part of U.S. application Ser. No. 14/269,072 filed May 2, 2014 (now abandoned) which claims priority to U.S. Provisional Application No. 61/818,880 filed May 2, 2013 which is incorporated by reference herein.

BACKGROUND AND FIELD OF THE INVENTION

Field of the Invention

The present invention relates to a transportation system. More particularly, the present invention relates to a system for transportation of people and freight loads using electric vehicles (EVs) which have the capability of sharing electrical energy in a dynamic, flexible and bi-directional manner. The sharing is accomplished using a mechanical and electrical coupling system which can connect two or more vehicles into a cluster while they are in motion. Although the main objective of this invention is to increase the cruising range of EVs through collective energy sharing on the road, once these vehicles are connected for electrical energy sharing, it is also possible to share the driving responsibilities as well as to share or interchange passengers and cargo between the vehicles. As vehicles are connected into a cluster of combined vehicles for electrical energy sharing, it shortens the safe distance between vehicles greatly, resulting in a higher usage efficiency of the road and highway systems.

Background of the Invention

Currently, the rapid deployment of electric vehicles has been hampered by a lack of charging stations. The size of charging station infrastructure is much smaller than the current size of gas filling station infrastructure. As these two are competing for the same resources (real estate and customers), the larger vested interests held by the latter becomes a great inertia and obstacle for the former to overcome not to mention to overtake. For new investors interested in building more charging stations for potential electric vehicle owners, this presents a chicken and egg problem: "where fast charging station deployment require vehicles, but prospective vehicle owners want to see charging stations in the public before buying" CHAdeMO and SAE DC Fast Charging adoption possibilities—electric vehicle adoption prospects are hanging in the balance.

A second significant hindrance to mainstreaming electrical vehicles is the time required to charge the battery. The battery charging time is much longer than the gas tank filling time for an amount of equivalent energy. Proposed and attempted solutions include: fast charging technology, battery swap stations, dual mode and range extending plug-in hybrids and dual-mode vehicles.

The current fast charging technologies have not proven fast enough to compete in the marketplace. Implementation of further faster charging technologies coupled with the increasing demand for electric vehicle's is raising grave concerns about placing additional strain on the existing electrical grid infrastructures. Other deterrents to the proliferation of fast charging technologies include: fragmentation in emerging charging (fast charger format wars in both the physical plug/receptacle, electrical voltages and maximum current allowed), lack of universal designs and adaptations, and the quick drain of the battery life when a fast charge is repeatedly applied. Different charging standards and different charging formats have emerged causing some incompatibility among charging stations. The following articles which discuss how this fragmentation poses harm to electric vehicle consumers are hereby incorporated by reference: Multi-Protocol Stations Could Resolve Fast Charging Standards War and One Size Fits All: A Combo Plug That Can Handle Fast Charging.

As discussed in Standardized Electric-Vehicle Battery Swapping Won't Happen: Here's Why which is hereby incorporated by reference, the battery swap concept is an impractical solution given proprietary technologies, sizes and weights, and the difficulty in removing battery packs. These all converge to hamper efforts to seriously develop a wide-scale battery swapping industry.

The dual mode (i.e. Puget Pullway or Qwiklane) entails electric vehicles capable of sharing power sources with other electric train- or subway-style rooftop or road-side pickup in a special electrified lane including magnetic-induction pickup embedded in the road surface of that special electrified lane. This also requires an equally massive investment in both the road electric supply infrastructure as well as new vehicle designed with duplication of equipment. Wired (e.g., rooftop) pickup and wireless (magnetic inductive) pickup require massively high cost infrastructure not yet in place and construction is disruptive (especially magnetic inductive pickup embedded in road surface, it is also subjective to road erosion). Vehicles cannot expect to rely on this technology to go anywhere like conventional vehicles, hence vehicles using such modes are configured with both pickup devices and conventional fuel engines or large batteries. Hence they are called dual mode vehicles. Also, unlike tracked vehicles such as subways, the wireless magnetic inductive pickup mode offers no mechanical guidance (track) function for automatic driverless operations and no extra mechanical help under slippery road conditions.

DESCRIPTION OF RELATED ART

One rapidly growing technological field in range extending electric vehicle includes: range extending trailers and plug-in hybrids.

A guided vehicle for use with a dual mode transportation system as described in U.S. Pat. No. 7,168,661 to Fox which discloses a train of interconnected vehicles on a guided roadway. The hook and latch assembly of Fox rudimentarily serves the purpose of mechanically coupling and uncoupling in a manner similar to that used for heavy-duty towing hitches. Fox also describes a system in which "employees are hired and trained to operate buses during conventional use and throughout the coupling process."

A semi-autonomous vehicle providing an auxiliary power supply as described in U.S. Pat. No. 8,627,908 to Wellborn discloses a high-voltage electric power bus for transferring electric power between an auxiliary trailer which and a parent vehicle. According to Wellborn, the connection between the semi-autonomous wheeled vehicle and the parent vehicle includes no mechanical load during operation for providing conveyance of a high-voltage electric power storage system.

The range extending trailer vehicles of Wellborn are still a conventional electric vehicle or Plugin hybrid with an energy supply component in 1:1 relationship to the energy demanding component. The automation in his semi-autonomous trailer seems only in reference to the trailer's ability to follow its parent vehicle in front without being in hard physical connection together. There is no mentioning on how the electrical connection is hooked up. Additionally, Wellborn's as well as Cox's coupler design are not amenable or scalable for multiple electric connections on the same coupler and are not deployable on the sides for lateral electrical supply and do not provide for mechanical connections, automation of connect and disconnect at speed, matching surfaces to guide connections, or flexible electrical connections.

A self-propelled electric vehicle recharging trailer as described in U.S. patent application Ser. No. 12/557,788 to Collins discloses a recharging trailer including an electrical generating unit, a fuel powered engine with propulsion unit and a controller to control the engine. Collings, much like the Wellborn, devises a means of extending the driving range of purely electric vehicles by providing a fuel source that moves with the vehicle.

The present invention presents a solution to the problem of dynamically and bi-directionally exchanging energy between vehicles as determined by each vehicle's supply and demand of electrical power. The present invention supplies electrical power sources to meet the demand when and where the demand is made. The present invention further allows for combining medium size buses when needed. A medium sized bus may be designed for more flexibility in the route structure to incorporate smaller ridership loads and more easily traverse narrower roadways.

The prior art as a whole teaches vehicles that have their own integrated and inseparable power store/source (engine, etc.), whose energy storage/source has to be replenished (gasoline fuel) or charged (battery) by stopping the vehicle at a fuel-filling/charging station independent of any other such vehicle on the same road, and each vehicle has to be driven by a dedicated licensed (trained) driver, who is mostly independent of the drivers of other vehicles in the vicinity on the same road system, not knowing one another's immediate destinations. This makes a system wide vehicle dynamic route planning and management extremely difficult, resulting in very little utilization of resource in a sharing manner (vehicle pooling). The conventional tightly coupled 1 to 1 design of today's motor vehicles directly results in too many vehicles on the road, causing traffic congestion and poor efficiency in the use of energy (fuel or electric) resources as well as more air polluting exhaust.

In addition, the concern of human driver's relatively "slow" response to the road and traffic conditions around his/her vehicle as well as each other's driving behaviors and intentions (whether the next driver is a good driver or not) dictates that a safe distance must be maintained between one vehicle and the vehicle immediately ahead (as well as between vehicles on adjacent lanes). This safe distance between vehicles driving in the direction in the same lane directly results in poor usage of the roadway. Some designs of automatic driving with auto-sensing of the distance to and the speed of the vehicle ahead are trying to address this shortcoming so that a more tightly packing of vehicles in a congested highway is possible. However, such auto-driving devices designed to handle a mixture of auto-driving and manual (human) driving in close packing are very difficult to implement for obvious reasons.

In the end, none of the related art discloses an effective or efficient system to address the present-day reality of the multi-modal transportation systems found in megalopolis sprawls, especially those rapidly posing major health concerns among the populations of the world's most densely populated urban areas.

SUMMARY OF THE INVENTION

The goal of this invention is to remedy the current difficult situations in the deployment of electric vehicles, namely not enough charging stations, relatively long charging time (relative to gas-filling time), bulky and heavy batteries (resulting in large space and weight requirement on the vehicle that carries it, also relative to the space and weight requirement of gasoline with the same amount of usable energy). The solution proposed in this invention is to couple two or more vehicles to each other so that electric energy can be exchanged between the vehicles depending upon each individual vehicle's supply and demand. As vehicles which have excess electrical power join a cluster of vehicles, they are able to deliver power to those vehicles which have become more depleted of energy so that the cluster of vehicles can continue travelling without the need to stop for re-energizing.

To realize this plan, two aspects, energy transfer method and navigation method, must be addressed. (a) a vehicle connection and energy transfer method which can be used to connect two or more vehicles together while travelling at highway speed in the same direction and at the same speed or stopped in order to start electric energy transfer from one vehicle to another. The apparatus used in this method are (i) the physical coupling units with electrical connections and mechanical connections and (ii) the power cable routing units (SRU). Both the coupling connectors and the power cable routing units are described below. During operations these apparatus are controlled by the vehicle's electronic control units (ELECTRONIC CONTROL UNIT). The ELECTRONIC CONTROL UNITs performing this function will be described below together with the description of the other aspect, namely vehicle navigation, a function that the ELECTRONIC CONTROL UNITs also perform.

The navigation method is used to direct the two vehicles to meet at a common point on an agreeably shared segment of their travelling routes so that they can physically connect and start the energy transfer as one vehicle may meet a few other vehicles in different segments in the course of its journey for this purpose a plan operational vehicle to vehicle communication is required.

The present invention allows for vehicles to be automatically swapped in and out depending only on their energy state. Therefore, the cluster need not stop to get re-charged, hence charging time and range-anxiety concerns are alleviated. The related prior art cited above assume that the leading primary vehicles are still conventional electric vehicles with large batteries which require range-extending trailers as charging stations are not readily available. So their coupler designs are not directly applicable to the present invention.

According to embodiments of the present invention, automatic multiple electrical connections between vehicles allow for multiple electrical connections in one coupler and multiple couplers in one vehicle so one vehicle can simultaneously supply electrical energy to more than one electric vehicle. This function also allows a vehicle to act as an electrical energy supply relay/hub to distribute electrical energy from another vehicle multiple vehicles. This relay/hub function is also desirable in addition to auto-connect in charging stations as it reduces the number of charging stalls by making one charging stall to serve more than one electric vehicle allowing for a recombination of two or more vehicles with ease requires a physical electrical connection that can automatically couple and uncouple while both vehicles are moving at highway speed.

Accordingly, the present invention proposes that the technology of the "self-driving" vehicle can co-exist with the transportation system of the present invention. However, if the power unit and the payload unit are still tightly integrated in the same fixed 1-to-1 configuration as the present day vehicle, these self-driving vehicles will not be able to reap the full energy and driver/passenger time saving benefits of the present invention as they, like the conventional vehicles, would still have to go to a gas/charging station and stop there to get replenished in their fuel and/or electrical energy store.

This invention uses a unique and novel matching tongue and groove inter-connection face design or flat inter-connection face design with self-aligning set of matching pins and socket wells and has several features to allow the implementation of computerized (thus, automated) electrical and mechanical connections, either in the vehicle stand-still mode or during vehicle movements, between a wide range of road vehicles (automobiles) and rail vehicles (trains or street vehicles that run on a systems of tracks) including between road vehicles and those rail vehicles that share their rights-of-way with road vehicles (like those rail vehicles in San Francisco MUNI that run on the tracks laid down on the city streets where automobiles also share.)

These features include:
All vehicles are self-propelled and steerable; although the connection can handle pushing and towing.
On board control systems through their wireless communications talk to each other allowing both vehicles to approach within a certain distance of a few feet and relative speed is near zero allowing these two vehicles to approach each other.
Video/imaging system focuses on the alignment markings on the upper side of both sides of couplers, to engage the couplings so triangle vertical ridge (#, patent) goes into the corresponding groove(s) (#, patent) with the least amount of friction.
Front/Rear connection coupling using all sensors allowing connection to be made while traveling: radar, LIDAR, laser, ultrasonic, video (including imaging system), proximity sensors.
Relative speed for approaching, sensors measure relative distance between vehicles, steering controls on both Vehicles (preferred embodiment has all wheel steering).
Finer lateral control mechanism using all wheel steering. This particular feature will be instrumental in the event of windy conditions on the road.

The present invention offers enhanced safety due to the combined reliability, security and strength of the combined vehicle promoting automation and efficiency through sharing energy in a "forced" shared driving. The overall energy saving realized by not stopping for "fueling" indirectly affects the environment. Another direct benefit promoted by the present invention is the reduced traffic congestions by denser packing of the vehicles and fewer number of vehicles on the road due to higher sharing or modularizations. Hence, the transportation system of the present invention offers significant cost-savings realized in terms of energy consumption and safety as the coupling (and decoupling) process of the present invention eliminates today's single vehicle. A combined vehicle can be expected to be inherently safer in some aspects than a single vehicle (redundancy, more control, etc.) Additionally, the semi-autonomous embodiment of the vehicle of the present invention includes a safety chain control system monitoring structural and signal integrity of the non-load-hearing coupling mechanism. The safety chain control system monitoring of the present invention provides structural and signal integrity of the non-load-bearing coupling mechanism is configured to detect a fault associated with one of the non-load-bearing coupling mechanism when mechanically connected to the connector of the parent vehicle, the extra-vehicle communications system signally when connected to the communications system of the parent vehicle, and the extra-vehicle sensory system when detecting the target device mounted on the parent vehicle.

The use of the term Conventional Vehicle refers to the present day automobile, where the power section, which is the vehicle's energy storage/source section (engine in fossil fuel burning vehicles and hybrid vehicles, battery in hybrid vehicles and electric vehicles) and its cargo section, which is the cabin for its driver and passengers (or cargo in the case of a truck) are tightly integrated in one inseparable body. A conventional vehicle must be driven by a dedicated driver sitting in the driver seat, although in the future, a conventional vehicle may progress into a self-driving vehicle, but as long as its power section and its cargo section are still integrated in one inseparable body, this future self-driving vehicle will still be categorized as a conventional vehicle, albeit a self-driving conventional vehicle.

Another objective of the present invention is to reduce air pollution by drastically reducing and ultimately eliminating fossil fuel burning vehicles on the road in the city (as well as on the roadways outside of cities) to reduce the amount of vehicle carbon dioxide and other air-polluting exhaust of these vehicles, and also by drastically reducing the need of energy-wasting "stop and go" (e.g., traffic at cross intersections, stops for gasoline-filling, battery charging, passenger changing vehicles (bus) during trips, etc.). Additionally, through this system wide auto-driving, auto-piloting and auto-route managing, the requirement to have a dedicated and skilled (driver-licensed) vehicle driver for every vehicle in the system on the road can be eliminated, thus achieving another saving of energy by not having to vehicle carrying the weight of this driver. The saved driver position and payload can be used for additional passenger or payload.

Of particular advantage of the system wide auto-control and auto-managing of the transportation system of the present invention will result in much reduced cases of traffic congestion and the number of accidents caused by human-driver errors (e.g., driver fatigue on a long stretch of highway driving). Accidents such as rear-end collisions may be totally eliminated in the novel transportation system presented herein. By tightly packing vehicles into combined vehicles and/or combined vehicle clusters, traffic jams can be eliminated by the increase of the efficiency of highway/road usage. According to further aspects of the present invention, system-wide planning and managements of all the components of the present invention on the road through cloud control management provides for the potential for cities to best utilize existing infrastructure to plan traffic flow (e.g. coordinating traffic patterns at intersections to minimize breaks in the traffic flow, and the frequent need to slow down and/or stop at the intersections).

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention, they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings.

DESCRIPTION OF THE PREFERRED EMBODIMENTS

Figure 1A:
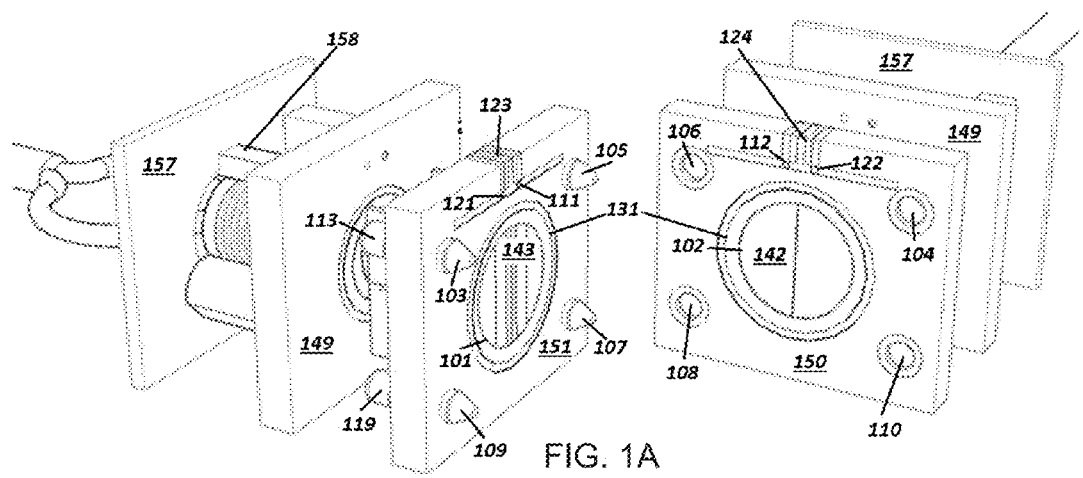
FIG. 1A shows a schematic drawing of the detail of the coupler design for the electrical connection.

The following detailed description of exemplary embodiments for the invention makes reference to the accompanying drawings, which form a part hereof and in which are shown, by way of illustration, exemplary embodiments in which the invention may be practices. While theses exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for the purposes of illustration only to describe the features and characteristics of the present invention and to sufficiently enable one skilled in the art to practice the invention. Accordingly, the scope of the present invention is to be defined solely by the appended claims.

The foregoing and other objectives, features, and advantages of the invention will be more readily understood upon consideration of the following detailed description of the invention taken in conjunction with the accompanying drawings.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the below definitions shall control.

Guide-way: A groove or track along which an object moves. The guide-way normally provides both physical support like a road, as well as the guidance (and possibly other linkages such as the power source). In the case of fixed-route systems, the two are often identical in the same way that a rail line provides both support and guidance for a train.

In this document, the terms, power and energy are often used interchangeably but technically these two terms have specifically different meanings: electric power denotes the rate of electric energy flowed, supplied, consumed per unit time (or per unit distance when there is a relationship between distance and time, like vehicle speed). The electric power is usually measured in kilowatt or kW. Therefore, the total amount electric energy used can be expressed by the electric power supplied multiplied by the total length of time that electric power is used. Hence, we often use kilowatt-hour, or kWh, as units of electric energy. Since electric energy is charged into a storage device like a battery, the word, charge, is often used synonymously with electrical energy.

The original designs of the payload carrying automobiles involved four functions: 1. Energy Store/Source (engine, tank of fuel, motor/generator, battery, and/or other energy source, e.g., ultra-capacitors, high-voltage electrical energy storage system or other possible energy store/source like fuel cells, hybrid fuel cells, when their design become mature enough so that their use becomes readily available); 2. Propulsion Generation (fossil fuel engine, electric engine, motor-generator, electro-magnetic drives and/or similar engines); 3. Payload (passenger, cargo) carrying compartment or platform; and 4. Vehicle Control (driving—steering, acceleration, braking, navigation) which must be exerted by a trained human driver of that vehicle.

For the purpose of this invention, we shall use the word "INTEGRATED" to specify a single vehicle which contains all of these functions in non-shareable way, which are listed above. Current vehicles on the road, whether they are fossil burning vehicles, hybrid vehicles, and purely electric vehicles are examples of this integration. We shall use the word "COUPLED" in this invention to specify a combination of two or more vehicles electrically and mechanically connected to each other. The device which joins the vehicles to each other shall be referred to as the "COUPLER". We shall use the phrase "ARTICULATELY COUPLED" to indicate that the connection has some flexibility so as to permit small rotational (roll, pitch, yaw) movements of the vehicles relative to each other. Semi-truck and trailer vehicles, railroad trains, and articulated buses are examples of this phrase. We shall use the phrase "TIGHTLY COUPLED" to indicate that the combined vehicles are mechanically connected to in such a manner that they move as one NON-ARTICULATELY COUPLED unit and are constrained from of any independent rotational motions relative to each other.

For the purpose of this invention, we shall use the term "electrically SHAREABLE" or just "SHAREABLE" to indicate the two or more coupled vehicles which are capable of bi-directionally moving electrical power between these coupled vehicles in a dynamic mode. This means that the electrical power can more move between coupled vehicles towards which ever vehicle which need electrical power and whenever it is needed. As coupled vehicles travel, the vehicle which receives the electrical power may shift from vehicle to vehicle depending upon demand. This power, which may be shared from another vehicle in the combined configuration, can be used to energize the receiver's wheel driving motors and/or re-charge the receiver's power storage.

"Shareable" will also refer to the driving mode for coupled vehicles when one of the coupled vehicle will exert vehicle control through vehicles' ECU device for all of the coupled vehicles through each one's electronic control unit to control acceleration, deceleration, steerage, and navigation.

For the traditional vehicles, this integrated design means that each such vehicle has its own integrated, inseparable, and inseparable power store/source (engine, etc.), whose energy store/source must be replenished (gasoline fuel) or charged (battery) by stopping the vehicle at a fuel-filling/charging station independent of any other such vehicle on the same road, and each vehicle has to be driven by a dedicated licensed (trained) driver, who is independent of the drivers of other vehicles in the vicinity on the same road system and who has little knowledge of other driver's destinations or intentions.

This makes a system wide vehicle dynamic route planning and management almost impossible, resulting in very little utilization of resource in a sharing manner, such as carpooling, which directly results in too many vehicles on the road, causing traffic congestion and poor efficiency in the use of fossil fuel or electric energy resources as well as more air polluting exhaust.

Some possible conditions for such a coupling are for sharing electrical power and/or for sharing driving responsibilities. Shared driving is necessary for a combined vehicle in the state of sharing energy. However, once the coupling is in place, the combined vehicle can be for driving only without energy flowing and sharing. The design is for sharing energy first with a side-effect of drive-sharing as well as reducing traffic congestion.

There are two aspects in terms of sharing electrical power: 1. One vehicle has excess electrical power for a given segment of its travelling plan, which can be shared with another vehicle which is travelling in that same segment, and 2. One vehicle is in need of extra power from another vehicle In terms of sharing driving responsibilities, side effects could include shared driving and navigation; improved road utility efficiency by drastically reducing safe inter-vehicle distance; increased redundancy and security, and increase road handling capability by having more wheels on the same, combined vehicle on the road.

For the purpose of this invention, we shall use "PATH" and "VIRTUAL TRACK" in a large macro scale route planning task to describe the series of waypoints that the center of a vehicle or a cluster of connected vehicles will meet as they travel from point A to point B. The PROPOSED PATH consists of the intended waypoints. In contrast, the ACTUAL PATH, consists of the waypoints which the vehicle or cluster passed through. These waypoints not only consist of both positions on the map but also time of arrival at those points. At this macro scale level for route planning purposes, the length and the outside dimensions of the vehicle would be too small in comparison with the route length; hence, the use of only a single center point of the vehicle suffice for this task. At this scale, the path must only specify where to turn (if any) and what the average speed would be in order to get from A to B. It would not specify how the vehicle would be commanded to make those turns at what actual speed. On the other hand, in the small micro scale of moment to moment vehicle driving and navigation, the vehicle needs to know exactly how to make those turns and at what speed. At this micro scale, the center point is no longer enough and must be expanded to a line segment with its leading point being the front center point of the vehicle and its trailing point being the rear center. Given this center line segment together with the outside dimension of the vehicle and the frame location of its wheels, the intended (with any local variations) tire path or track marks for each wheel can be calculated from center line segment on the intended path. If the intended path involves a turn, then the intended tire marks would be curved (with the radius of the curvature no smaller than the vehicle's minimum turning radius) and the corresponding wheel needs to be turned (oriented) in an angle (or angles in a turn time profiles) so that its tire would follow that curve. In the meantime, the wheel needs to rotate so that the vehicle would advance in a speed (or a speed time profile) commensurating with that turn profile for the tire to be on track and on mark. These microscale wheel turning orientation profile is called "Steering commands" or simply steering and these microscale vehicle speed profile is called "Speed commands" or simply speeds in the discussions of vehicle navigation in this invention. It should be noted that the "Speed command" can be further to acceleration and deceleration, the latter consists a combination of regenerative braking and frictional braking. A road vehicle is driven at the micro level from moment to moment either by a human driver through instinctive hand-(and foot-)eye coordination or by a computer through feedback sensor measurements, track-time computations and the "Steering command" and the "Speed command" If the orientation angles specified in the steering command does not exceed the steering capacity of that wheel and the speeds are within the safe speed range for that turn, then the turn computation is acceptable for that wheel. If each and every wheel of a vehicle can accept the turn track computed this way, then the turn track is acceptable for the vehicle to make. This line of reasoning would work for a vehicle with all-wheel steering and driving functions no matter how many wheels of that vehicle or the combined vehicle has. Also, in all wheel steering vehicles, lateral movements like lane changing would be done in a crabbing movement which is more stable and controllable than the conventional front-wheel steering, where the turn calculation is much more complicated. Therefore the preferred embodiment for the vehicle wheels is an all-wheel independently steerable with individual driving motor design, such as the Michelin Active Wheel or the wheels of Siemens VDO eCorner Project.

The term "dual mode operation" can be used in two connotations: It can refer to a vehicle which is capable of traveling either on a typical roadway or traveling on a fixed set of tracks, such as a railroad tracks. It can also refer to a vehicle which is capable of deriving its power either from internal sources or from the external electrical grid. The vehicles of the transportation system in this invention do not by themselves have the duplicate dual mode mechanisms either in the sense of track guiding or receiving grid power. Therefore, they cannot be classified as dual mode. However, the coupling system in this invention can allow a tracked vehicle (not necessarily a dual mode vehicle) to be connected to a road vehicle, when the tracked vehicle is traveling and sharing the same roadway as the road vehicle or when the tracked vehicle is a guide-member vehicle (to be described later) that can be laterally connected to a road vehicle traveling side by side. When so connected, the combined vehicle has the advantage of having dual mode operation without any of the member-vehicles being dual mode.

Unless otherwise explicitly provided in the claim language, steps in method or process claims need only be performed in the same time order as the order the steps are recited in the claim only to the extent that impossibility or extreme feasibility problems dictate that the recited step order be used. This broad interpretation with respect to step order is to be used regardless of whether the alternative time ordering(s) of the claimed steps is particularly mentioned or discussed in this document—in other words, any step order discussed in the above specification shall be considered as required by a method claim only if the step order is explicitly set forth in the words of the method claim itself. Also, if some time ordering is explicitly set forth in a method claim, the time ordering claim language shall not be taken as an implicit limitation on whether claimed steps are immediately consecutive in time, or as an implicit limitation against intervening steps.

Any and all published documents mentioned herein shall be considered to be incorporated by reference, in their respective entireties, herein to the fullest extent of the patent law. The following definitions are provided for claim construction purposes. Present invention: means at least some embodiments of the present invention; references to various feature(s) of the "present invention" throughout this document do not mean that all claimed embodiments or methods include the referenced feature(s). Embodiment: a machine, manufacture, system, method, process and/or composition that may (not must) meet the embodiment of a present, past or future patent claim based on this patent document; for example, an "embodiment" might not be covered by any claims filed with this patent document, but described as an "embodiment" to show the scope of the invention and indicate that it might (or might not) covered in a later arising claim (for example, an amended claim, a continuation application claim, a divisional application claim, a reissue application claim, a re-examination proceeding claim, an interference count); also, an embodiment that is indeed covered by claims filed with this patent document might cease to be covered by claim amendments made during prosecution.

These linkages are standardized to be operated automatically to allow both electric power and digital data connections. In an alternate embodiment of the present invention, passages designed to transfer payload (people and their luggage) between vehicles while linked in transit may be desirable in some settings.

Vehicle whose platform consisting of: (a) controllable (steerable—preferred embodiment—all wheel steering)—fully automatic, computer driven without an active human driver or in various degrees of semi-automatic (with a qualified and active human driver) (b) electric motor driven self-propelled (preferred embodiment—all-wheel drive), (c) preferred embodiments of (a) & (b) above are in-wheel motor assembly with regenerative braking, (d) equipped with all available sensors required for positional and speed measurements. Radar, Lidar, ultrasound, Laser or LED+ corresponding optical sensors, Video (computer vision), GPS (further enhanced via cloud managements).

According to preferred embodiments of the present invention, two off-the-shelf wheel assemblies are prescribed in the design for all the vehicles of this invention. The Michelin's Active Wheel and the Siemens VDO eCorner wheel design. Both wheel designs incorporates active suspension system, which, in addition to allow dynamic vehicle height adjustments, provides a stable and level vehicle ride that cannot be achieved through the conventional passive suspension system. A stable and level vehicle ride as well as dynamic vehicle height adjustments are very essential in ensuring successful automated coupler connections on the road at highway speeds). In addition to the active suspension systems, both wheels feature the following:

(1) integral wheel driving electric motor; the Siemens' VDO eCorner wheel has an in-wheel motor design, while the Michelin's Active Wheel is power by an outboard motor that requires water cooling (however coolant flow rates are moderate when compare to ICEs); (2) regenerative braking; Concept cars (reference below) equipped with the Michelin's Active Wheel was claimed to be capable of delivering regenerative braking power greater than 1G without mechanical braking; (3) Siemens' VDO eCorner wheels use an electrical wedge braking system while Michelin's Active Wheel uses a regular mechanical brake that requires a hydraulic line hook-up; (4) integral electric steering; this allows all-wheel "Drive-by-Wire" steering design of the vehicles in the embodiments of this invention making vehicles more effective during coupler connection process as well as more maneuverable after coupler connection is made to form combined vehicles (vehicle cluster; (5) Both are off-shelf products with a single chassis attachment point and thus can be easily enhanced with active camber adjustments, which enhance handling characteristics and allow, together with active suspension, "walking" like body movements and positional adjustments in a large vehicle like a bus with multiple tandem wheels.

Preferably, according to aspects of the present invention many different types of energy vehicles may be used. Accordingly, an energy module may store energy produced from a wide range of power sources and fuels. Preferably, each type of energy module will convert the energy generated into electrical energy that will pass from the energy module to the propulsion platforms for vehicle carrying payload. Listed herein are exemplary kinds of power sources and fuel which may be used and from which the energy vehicles of the present invention may use: Battery (electricity), Bioalcohol, Biodiesel, Biodiesel, Biofuel, Biogas, Compressed air energy storage, Ultra-capacitor, Concentrated solar power, Diesel, External combustion engine, Hydrogen gas, Spoke flywheel, Fischer-Tropsch process, Flywheel, Fossil fuel cell, Gasohol, Light crude, Liquid fuel, Magneto hydrodynamic generator, Methanol, Natural Gas, Peat, Petroleum, Photovoltaics, Products based on refined oil, Solar energy, Solar thermal energy, Solid fuel, SSTAR (small, sealed, transportable, autonomous reactor), Stirling engine, Sulfur-iodine cycle, Synfuel, Syngas, Fast-charging batteries FIG. 1A a schematic drawing of the detail of the coupler design for the electrical connection will now be discussed. As shown in FIG. 1A, the electrical port of the coupler system in this invention consists of two mutually matchable ports, the male electrical port and the female electrical port. The male port will contain a male electrical plug, and the female port will contain a female electrical socket. Commercially available electrical plug and socket systems will be used, for example the Tesla plug and socket. Both the male and female ports have identical mechanisms to extend or retract the electrical connectors. The outer face 150 of the female electrical port is rectangular in shape. It has a large port hole 102 in the center through which the electrical power connecting receptacle (female) 140 will extend to meet the corresponding male plug 141 in the coupling process. To protect the internal electrical and mechanical components of the port assembly, the window is covered by a door, which is located on the inside of the outer face. The doors 142, 143 open into or close from inside of the port. This necessary as the two outside surfaces of the mating ports are in contact before the windows door opened.

Figure 1B:
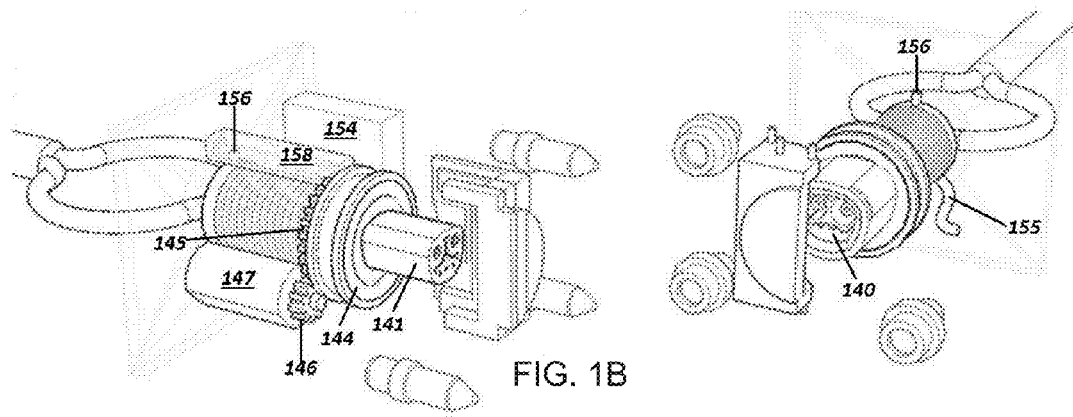
FIG. 1B shows two preferred embodiments of the door pins in which each one of the door elements has two pins, which move in grooved tracks within the port assembly.
Figure 1C:
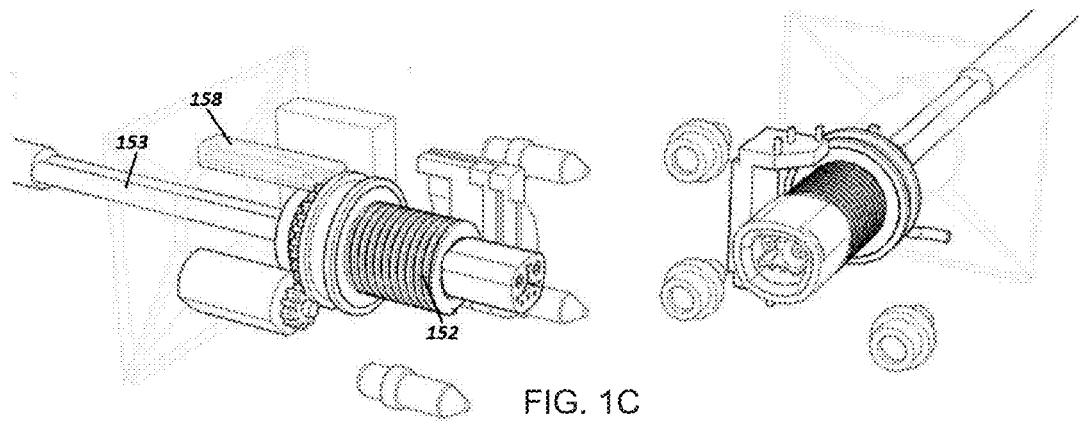
FIG. 1C shows the two preferred embodiments of the door pins in which each one of the door elements has two pins, which move in grooved tracks within the port assembly in the extended position.

When closed, pieces of the door extend into the center window to completely seal it from the outside environment. To open, the door elements retract back into the mechanism, separate, and fold further back away from the window much like the movement of a garage door. Each one of the door elements has two pins, which move in grooved tracks within the port assembly. Two different embodiments are shown in FIG. 1B. The male port door 143 involves six pieces which stack together along the sides. The female port door 142 has two pieces which rotate into the sides. Even though these are different designs, there is no impact on the matchability of the opposing front faces of the two mating couplers.

Surrounding the center window is a rubber O-ring 131 to provide a weather seal upon contact. Further away from the center window and spaced in a rectangular pattern are four circular and tapered metal socket wells (104, 106, 108 & 110). Above the O-ring 131 are located several marking strips 124 for matching and positioning the male and female port matching surfaces (namely metal socket wells 104, 106, 108 & 110 with their corresponding male pins 103, 104, 107, and 109 on the male electrical port). Behind each socket well is located an iron core with electric wire windings, through which passes DC electrical current, which is provided by the on board electronic control unit battery and controlled by the on board electronic control units 154. These electromagnets provide the attraction forces during coupling and repulsive force during decoupling and can be de-energized when additional and optional mechanical port(s) are engaged. In the bottom of each of the four wells are four micro contact switches (not shown) which can be used to sense the contact of the mating pins from the male port surface when the exact match point is reached in the coupling process and can also be used to test the strength of the holding power of the electromagnets.

The latter is accomplished by measuring the force necessary to pull the surfaces far enough away from each other so that the micro contact switches disconnect. In addition, there is a LED light 122 and a camera 112 located above the outer face so that the top of the face is illuminated and another set of marking cross-hair stripes 124 are visible. These are used to further facilitate the mating of the two surfaces. The electrical power receptacle 140 is located behind the window and the closed door pieces and it is centered within the window. It is fixed to the receptacle extender and electrically attached to the electrical power cable assembly.

The dimensions of the 4 corner metal wells (104, 106, 108 & 110) are fixed preferably at 150 mm (DIM A) horizontally center-to-center and 100 mm (DIM B) vertically center-to-center so that the electrical port window 102 can be large enough to handle the sizes of most electric vehicle fast charging plugs and receptacles. While the DIM A and DIM B must be held and fixed as a standard for the coupling process to reach an exact matching state, the size and shape of the electrical port window 102 can vary over a limited range without losing match ability of the male and female couplers. This small port window size variability may even apply between the male port window and the female port window since the male electrical plug is usually smaller in diameter than the female receptacle. For example, the ChAdeMO receptacle may need to have a bigger diameter than 80 mm for it to pass through, or alternatively, the CHAdeMO plug can be extended into the receptacle window. The diameter of electric port window 102 is 80 mm for the chosen Tesla super charge plugs and receptacles. Similarly, the dimension of the outside box can be varied to a limited range so that the metal pins and receptacles can be contained. Additionally, the male and female couplers can have different outside box dimensions without losing connectability so that different requirements of the strength of the coupler metal box can be met. The coupler box (housing) material is preferably the strong metal alloy casts as the wheel's material while the electromagnetic material remains ferric.

Figure 1D:
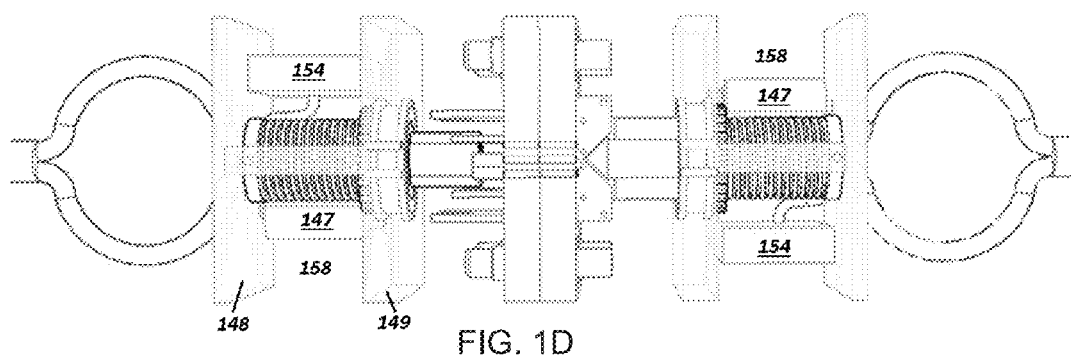
FIG. 1D illustrates a top view of the alignment of male and female outer surfaces with each other and electromagnets are energized, which will hold the two surfaces very tightly together.
Figure 1E:
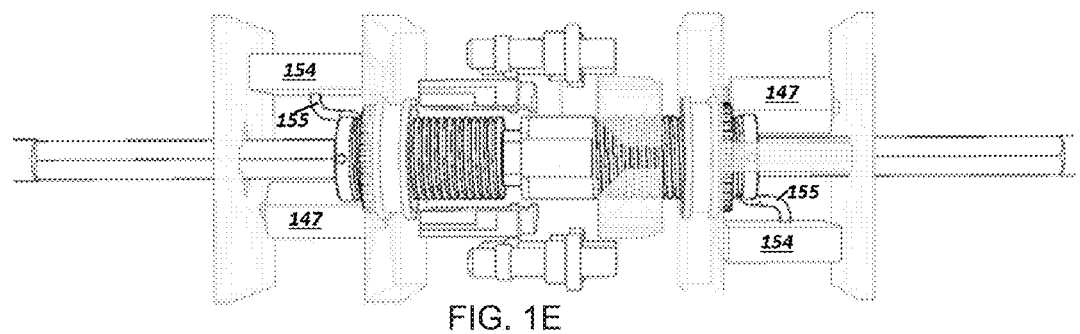
FIG. 1E illustrates a top view of the connection in an extended and fully engaged position.

The male electrical port has a similar outer face 151 which is rectangular in shape. It has a window 101 which matches the hole in the female outer face 102 in terms of location but not necessarily the size and shape (as discussed above). It also has protecting doors, which operate as described above with the female electrical port. As with the female outer face, the male outer face also has a matching O-ring 131 of a slightly larger diameter, and matching marking stripes. Embedded in the outface are a LED 111 and camera 121 arranged so that the LED 111 of the male port is opposite the camera 112 on the female outer face and the camera 121 of the male port is opposite the LED 122 on the female outer face. Further away from the center window are located four plugs [103, 105, 107, and 109] which are located to match the corresponding socket wells [104, 106, 108, and 110] in the female outer face 150. These plugs are tapered at the end to facilitate the final self-alignment with a tolerance of approximately 2 cm. The plugs are contain electromagnets, which by changing their polarity can either attract or repel the female socket wells. Once the male and female outer surfaces are aligned and in contact with each other, the electromagnets are energized, which will hold the two surfaces very tightly together as illustrated in FIG. 1D.

Now that the male and female electrical ports are rigidly attached to each other, the doors 142 and 143 which are protecting the electrical components within the port are opened. This permits both the electric plug of the male port and the receptacle of the female port to be simultaneously extended through the windows and towards each other using the same driving mechanism. For illustration purposes, the mechanism of the male port is described herein. See FIG. 1B. The driving unit is composed of an outer ring 144, which is rigidly attached to a toothed gear 145. This toothed gear is driven by a matched gear wheel 146 on the motor 147, which is attached to the rear plate [FIG. 1A, 157]. The outer ring 144 sits inside of plate #1, which is rigidly attached to the carrier, but can freely rotate within the opening of plate number one 149, which is rigidly attached to the carrier, but can freely rotate within the opening of plate number one. The inside of this outer ring is threaded and matches the thread on the outside of the "pusher" cylinder 152. The inside of the pusher cylinder is attached to the armored power cable 153, which in turn is attached to the electrical plug 141. Depending upon the power requirements, the cable can range up to 60 mm in diameter. Also shown is the local electronic control unit, 154 which is connected through a flexible cable 155 to the signal wire connections within the electrical plug 141. This local electronic control unit receives its power from the cable connection. It receives the image information from the cameras, controls the frequency of the LED, communicates with the electronic controller unit of the joining port, calculates the distance of separation of the two ports, calculates the degree of misalignment, and sends directions of motion to the main electronic control unit of the vehicle. The pusher cylinder 152 also has two pins 156 on opposite sides and at the aft end of the cylinder. There is another plate, plate number two 157, which sits at the aft end of the cylinder and keeps the cylinder from moving any further away from the front of the assembly. Attached between the two plates are two guide plates 158. These guide plates are located on opposite sides of the pusher cylinder 152 and have long slots which face the cylinder and are shaped to match and engage the pins 156 at the aft end of the cylinder. These slots permit the cylinder to move back and forth but not turn.

To connect and extend the electrical plug 141, the motor 147, under control of the local electronic control unit 154, is energized and turns the gear 145. This rotates the outer ring 144. Because the outer ring 144 is held in position by plate number one 149 and the pusher cylinder screw 152 is kept from rotating, the outer ring's rotation causes the pusher cylinder 152 to be pulled forward towards the exit hole 101. As there is a spring-loaded coupling between the plug and the pusher, which provides small flexibility like a human hand and its pusher, there is no need for a spring-loaded coupler for the female electrical port. Because there is a small amount of flexibility in the positioning of the electrical plug 141 and some matching tapering of the electrical plug 141 and funnel-shaped socket 140 small misalignments are self-correcting. To disconnect, the process is reversed.

The height adjustments that are necessary in achieving a close match of the coupling interface can be actively aided by the computer controlled active suspension systems offered in the Michelin Active Wheel or the Siemens eCorner Projects (see section paragraph [0058] and see MIT patent reference) on the side (either front-rear coupling or lateral coupling) that is closest to the couplers in the coupling process. Similarly, for coupler lateral adjustment for front-rear coupling can be aided by rear-wheel steering and all-wheel active camber adjustments.

Figure 2A:
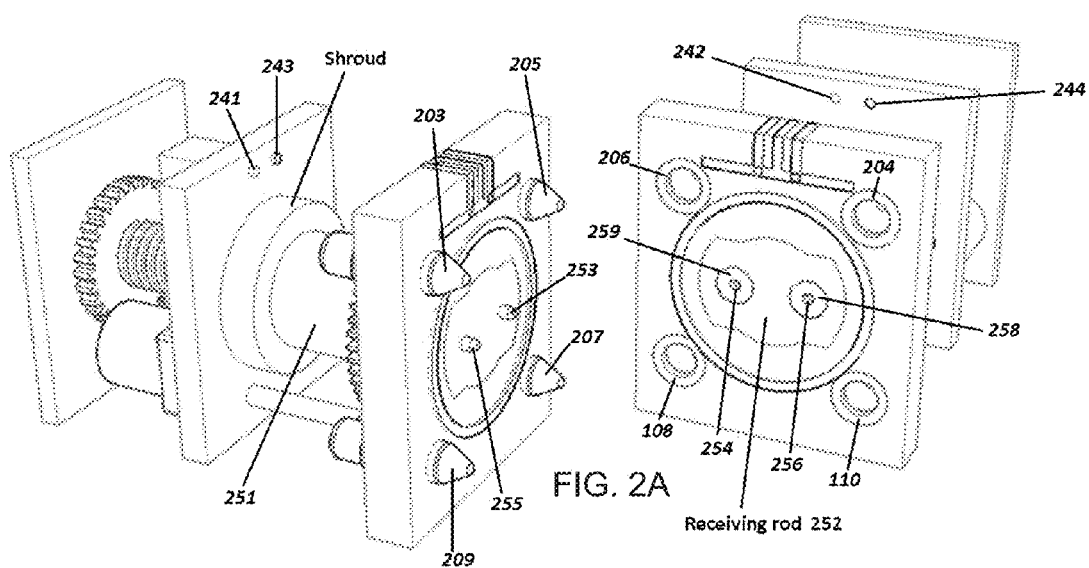
FIG. 2A shows a schematic drawing of the front faces of the mechanical male and female ports of the mechanical port subunit of the coupler.

With reference now to FIGS. 2A through 2H, schematic drawings of the detail of the mechanical port subunit of the coupler will now be discussed. The front faces of the mechanical male and female ports are shown in FIG. 2A and have many of the features with the same functions as those similar features in the electrical ports described in FIGS. 1A through 1E. Specifically, these are the cameras and LEDs for alignment purposes and the weather seal O-rings. Since these features have already been discussed in the section on FIGS. 1A through 1E, they will not be discussed in detail here except some critical differences noted in the following discussions.

With regard to the locations of the four corner port pins, the vertical DIM B remains the same 100 mm as that on the electric ports, and the horizontal DIM A is 100 mm as compared to the 150 mm for the electric ports (so the horizontal marker is 50 mm shorter). The significance of this difference to the size compatibility of the couplers that contain these ports will be discussed at the end of this section when the modularity of ports in the coupler design is discussed.

The objective of the mechanical ports is to extend a connecting rod, 251 (FIG. 2A) with a lockable keyed flange front end 282 (FIG. 2B) through a channel cutout with a matching shape 283 (FIG. 2B) in the opposite port to reach to the other side, and then the rod is turned 90 degrees into a locking position, locking the front walls of the two connecting coupler bodies together. The lock is then tightened on the male port side by two expansion rings, 271, 272 (FIGS. 2D and 2H) expanded outward to press on the inner side of the retaining disk end 281 (FIGS. 2B and 2H) of the connecting rod.

The connecting rod 251 in this embodiment consists of a round shaft with a 60 mm diameter. The outer rim of its flanged front end has an 80 mm diameter. This shaft in its locking position needs to span the two coupler front wall with a 25 mm thickness each, and an expansion rings and gear set which has a 20 mm unexpanded width and expand to 30 mm to take up a 10 mm slack to a tight lock. The 10 mm slack is reserved for the ease of the 90 degree turn. Therefore, the longitudinal distance between the inner surfaces of its two locking end pieces is 80 mm with a 60 mm total travel distance of its front end piece to reach its 90-degree turn-to-lock position.

Opposite to the connecting rod is the receiving rod 252 (FIG. 2A) of the female mechanical port. Its role is to accompany and guide the connecting rod in its 60 mm journey and then turn the front end of the connecting rod 90 degrees to a locking position. Therefore, the connecting process of the mechanical port has three distinct phases: 1). mating the coupler matching surfaces and moving the connecting rod through the 2 port channels 2). at end of the 60 mm advancement, the connecting rod is turned 90 degrees ready to lock and 3). expansion rings expand to take up the 10 mm slack and tighten the lock to spec. The disconnecting process runs the above phases in reverse and ends with the connecting rod and the receiving rod returning to their respective uncoupled position. Many of the above steps are performed by computer controlled electric motors. All drive motors in the embodiments of the coupler system in this invention have local electronic control units with onboard rechargeable batteries so that they can operate during power-loss emergencies and to cover surge usage of electrical power during local motor operations. The electronic control units, 261 and 262 (FIG. 2B), of the mechanical ports get their power supply and wired communication via cable connection to the electronic control units of adjacent electrical port. Please note also that in this embodiment of the invention, all the positional devices that move objects in this embodiment will have, when both longitudinal and rotational position encoders when needed, so that the position of the object being moved can be precisely known to the electronic control units.

In the following, we discuss the three phases of the connecting process in the order given above. When the couplers on which the mating mechanical ports as well as all other adjacent ports on the same coupler are aligned and closely matched, signals from the main electronic control units are given to the local electronic control units, 261 (FIG. 2B) and 262 (FIG. 2B), to engage the electromagnets of the port pins 203, 205, 207, 209 (FIG. 2A) and the sockets 204, 206, 208, 210 (FIG. 2A). (When a mechanical port is adjacent to an electrical port, the corresponding shared pins and sockets are under the control of the electronic control units of the electrical port but data like the readings of the contact switches and strain gauges are shared through computer communications). The contact switches at the well bottom of each socket serve to indicate the matching status of the two coupler surfaces. Additionally, electronic strain gauges to measure the coupling strength (web reference cited below) can be implemented at the base of each port pin and each port socket (one set of such locations are indicated by 245 and 246 in FIG. 2B). To filter out any strain data that might be caused by the relative movements of the two connecting vehicles, the electromagnets of the pins sockets can be pulsed on and off (at a rate corresponding to the temporal response of the strain gauge to its other stimuli so that strain data that has other temporal behavior can be removed differentially) and the difference of these strain measurements of the two states is more indicative of the connection strength due to the electromagnet holding force. (The absorber unit of the articulated mounting harness can also participate in this strength test and measurements.)

As the port pins are lined up with and pushed farther into their corresponding port sockets, the two small alignment pins 253, 255 (FIG. 2A), on the front face of the connecting rod, 251, are also pushed into their corresponding sockets, 254, 256 (FIG. 2A) on the front face of the receiving rod, 252. These two small sockets, being part of the solenoid units 257 (containing socket 254, FIGS. 2A and 2D), 258 (containing socket 256, FIGS. 2A and 2D) inside the receiving rod, are also equipped with (1) well-bottom contact switches for surface contact indication and (2) electromagnet units for holding the connecting rod and the receiving rod together as one closely coupled unit to move in unison during the travel of the connecting rod in its journey into the receiving channel of the opposing port accompanied by the receiving rod.

Figure 2B:
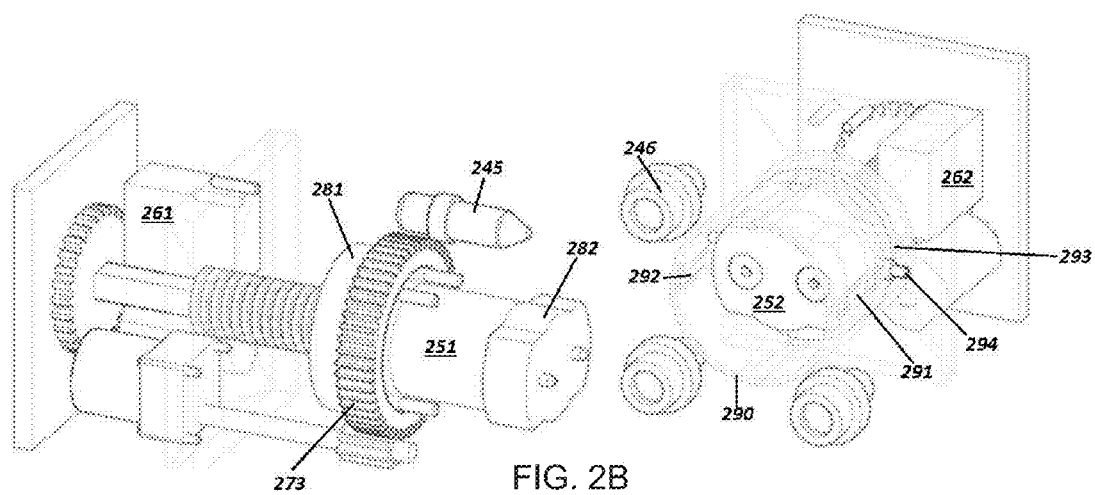
FIG. 2B shows the connecting rod with a lockable keyed flange front end extending through a channel cutout with a matching shape in the opposite port to reach to the other side.
Figure 2C:
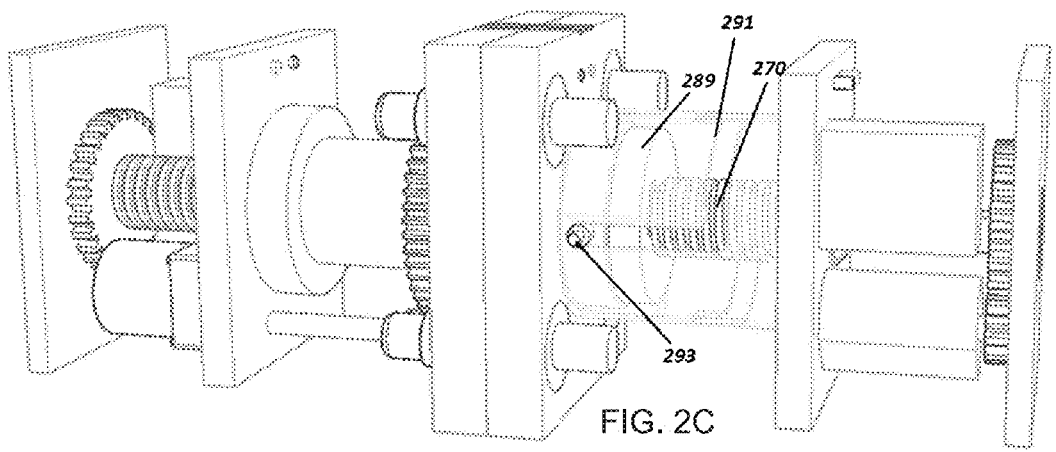
FIG. 2C shows the front walls of the two connecting coupler bodies together and locked tight on the male port side by two expansion rings.
Figure 2D:
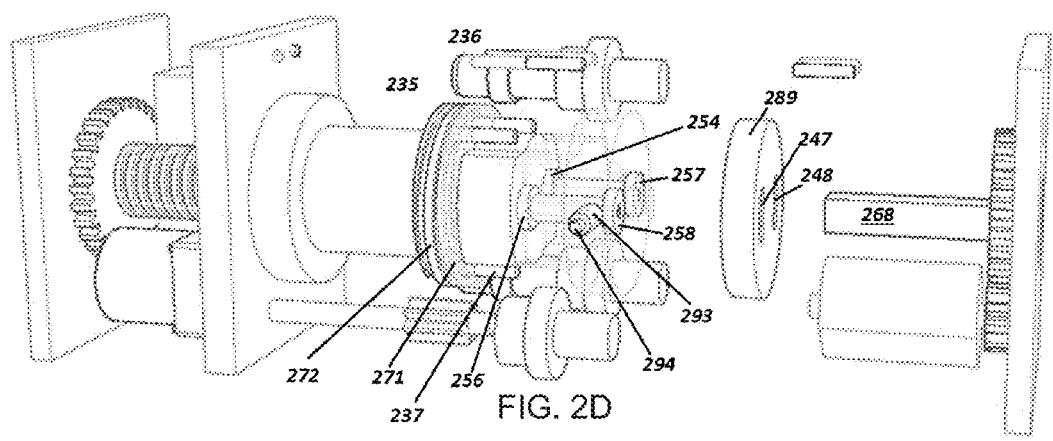
FIG. 2D shows the port pins lined up with and pushed farther into their corresponding port sockets.
Figure 2E:
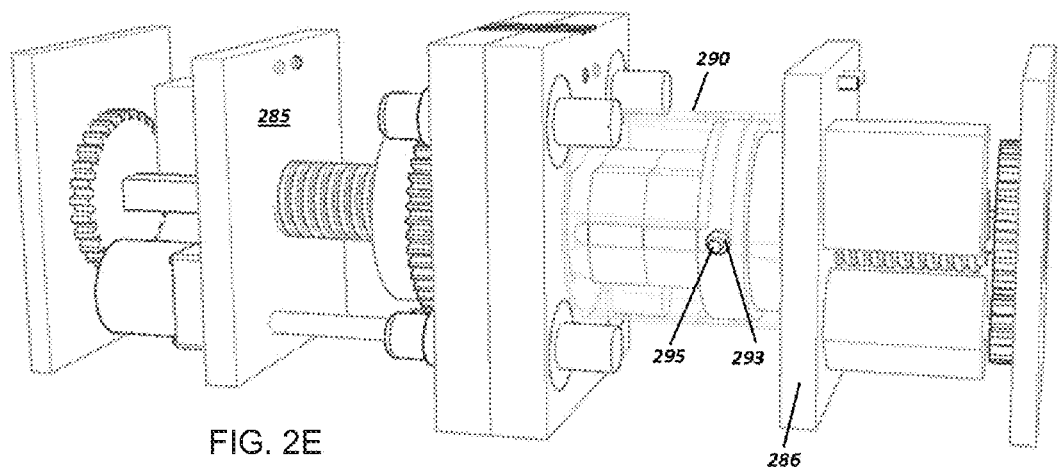
FIG. 2E shows two screws turning against the corresponding inner threads of the threaded holes on the middle support plates.
Figure 2F:
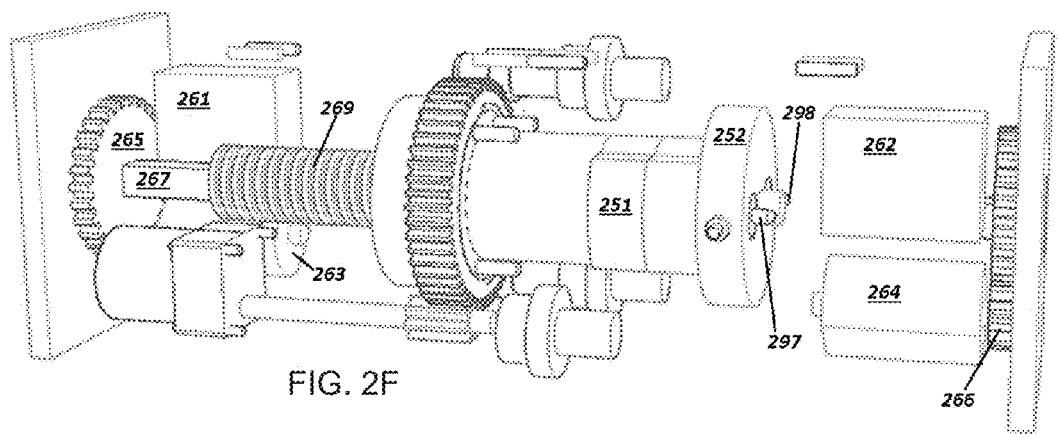
FIG. 2F shows the contact switches and strain gauges of the mechanical connection, the two local electronic control units, the corresponding motors, to turn the large gears which cause the square shafts to turn inside the corresponding pusher/puller screws.

When the contact switches and strain gauges indicate that the two coupler surfaces are in good contact order and ready for the initiation of the mechanical connection, the two local electronic control units, 261 and 262, send commands to the corresponding motors, 263 and 264 (FIG. 2F) to turn the large gears, 265, 266 (FIG. 2F), which cause the square shafts, 267 (FIG. 2F), 268 (FIG. 2D), which are integral parts of the their corresponding gears 265, 266 to turn inside the corresponding pusher/puller screws 269 (FIG. 2F), 270 (FIG. 2C). As these two screws turn, they are turning against the corresponding inner threads of the threaded holes on the middle support plates, 285, 286 (FIG. 2E), resulting in a relative movements between the screws and the corresponding plates. The direction the screws move depends on the rotational direction of the driving motors, 263 and 264 (FIG. 2F).

The inner end of the connecting rod has an axle stub 287 (FIG. 2H) that allows the forward end (near the port) of the screw 269 (FIG. 2F) to connect to the connecting rod through a bearing (not shown). In this way, the screw 269 (FIG. 2F) is longitudinally engaged to the connecting rod but not rotationally engaged allowing the screw to move the connecting rod forward or backward without turning it at the same time. Furthermore, the longitudinal engagement is implemented with a small (~3 mm) spring loaded slack (not shown in this drawing). Similarly, the inner end of the receiving rod 252 (FIG. 2A) of the female port has an axle stub 288 (FIG. 2G) that allows the turning disk 289 (FIG. 2C) to connect to the receiving rod through a bearing (not shown). In this way, the turning disk 289 (FIG. 2C) is longitudinally engaged to the receiving rod but not rotationally engaged allowing the turning disk to move the receiving rod forward or backward without simultaneously turning it. Furthermore, the longitudinal engagement is implemented with a small (~3 mm) spring loaded slack (not shown in this drawing). This slack together with the slack on the connecting rod side described above allows the two motors 263 and 264 (FIG. 2F) that move the mated connecting rod and receiving in unison to be slightly out of sync.

The two push screws 269 (FIG. 2F), 270 (FIG. 2C) has a pitch size of 6 mm per turn. Thus, with the two screws running at 2 turns per second (or 120 rpm), the movement of 60 mm can be completed in 5 seconds. Thus, in 5 seconds, the front end of the connecting rod is completely extended out of the receiving channel and is ready to be turned 90 degrees into a locking position (see FIG. 2E). Please note that since both the connecting rod and the receiving rod are not rotationally engaged to the screws that moves them.

Otherwise, once they are both out the channel, they would be free to turn and lose the precise position they should be in. Therefore, a shroud enclosure 290 (FIGS. 2B, 2C, and 2E) with two track cutouts 291 (FIG. 2B) and 292 (FIG. 2B) is implemented to ensure the positioning of the mated connecting rod and receiving rod. To use the track, two guide pins 293 (FIG. 2B) and 295 (not shown) on either side of the receiving rod are implemented and placed into the corresponding tracks as shown in FIG. 2B. In this arrangement, the receiving rod movements is directed according to this track. Similarly (but not shown in this drawing), a track shroud is implemented on the male mechanical port side with the two guide pins placed on the rim of the retaining disk 281 (FIG. 2B) to guide the travel of the connecting rod. The shrouds are not load bearing and made of transparent plastic so that the inner webcams (include audio) 241 and 243 (FIG. 2B) and LEDs 242 and 244 (FIG. 2B) can view through the shroud to make video images or movies of the conditions that the connecting rod and receiving rod are in. These images and movies are valuable feedback to the electronic control units and to the human operator(s). For example, the electronic control units can be programmed to recognize unusual gear grinding noise accompanied by abnormal position readings and alert the human operators for troubleshooting using the video cameras. The guiding pins 293 (FIG. 2B) and 295 (not shown) on the receiving rod have in addition a center bore through which wiring cables 294 (through guide pin 293 in FIG. 2B) and 296 (through guide pin 295 in FIG. 2B) go through to supply the signal and power to the solenoids 257 and 258 as well as to the electromagnet and contact switches in alignment sockets 254 (part of solenoid unit 257) and 256 (part of solenoid unit 258), that are located at the front of the receiving rod as discussed earlier. Only a stud of the wiring cables 294 and 296 are shown. The other ends of these cables join the cables from the port sockets (for the electromagnets, contact switches and strain gauges located there) and routed to the electronic control unit box. As the guide pins 293 and 295 swing with the travel and turning of the receiving rod, the cables also swing with it. Consequently, there are cable slack handlers in terms of pulling strings in place, but the slack handlers are not shown in the drawings.

When the connecting rod and the receiving rod duo reach the end of the 60 mm travel and are ready for the 90 degree rotation, this operation is aided by the turning disk 289 (FIG. 2C). To enable the turning disk to turn the receiving rod, which is not rotationally engaged to the turning disk as discussed before, the solenoids 257 and 258 are activated through the signal and power cables 294 and 296 by the electronic control units to extend the clutch pins 297 and 298 (FIG. 2F) outward 10 mm into the corresponding slots 247 and 248 of the turning disk 289 (FIG. 2D) allowing it to turn the receiving rod 90 degrees. That turning operation is performed by the screw 270 (FIG. 2C) which is integral to the turning disk. However, turning the screw 270 90 degrees with a 6 mm pitch rise also causes it to advance 1.5 mm toward the port. To prevent this advancement to unduly move the receiving rod/connecting rod duo causing problems with 90 degree turn track, the screw 270 preloads a 2 mm slack (discussed earlier) by drawing back first before activating the solenoids to extend their clutch pins. Also, the turning disk 289 (FIG. 2D) must be rotated to align its slots 247 and 248 to receive the clutch pins. During this 90 degree turn operation, the pusher screw 269 (FIG. 2F) on the male port side would need to hold still as the connecting rod is not moving longitudinally.

Figure 2G:
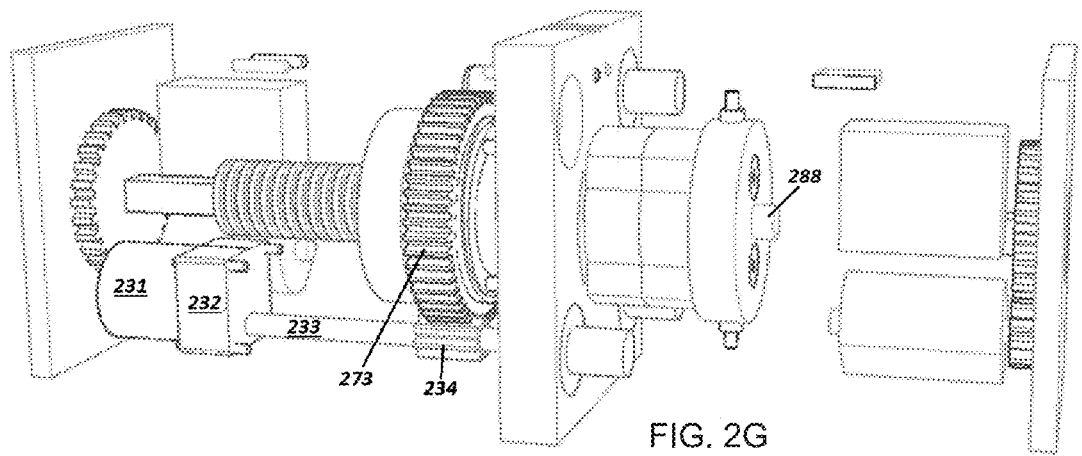
FIG. 2G shows the clutch pins retracted to return to their normal resting inner positions allowing the connecting rod and receiving rod to move again towards the ports until the inner surface of the front end of the connecting rod to lock on to the back surface of the female port's front wall.
Figure 2H:
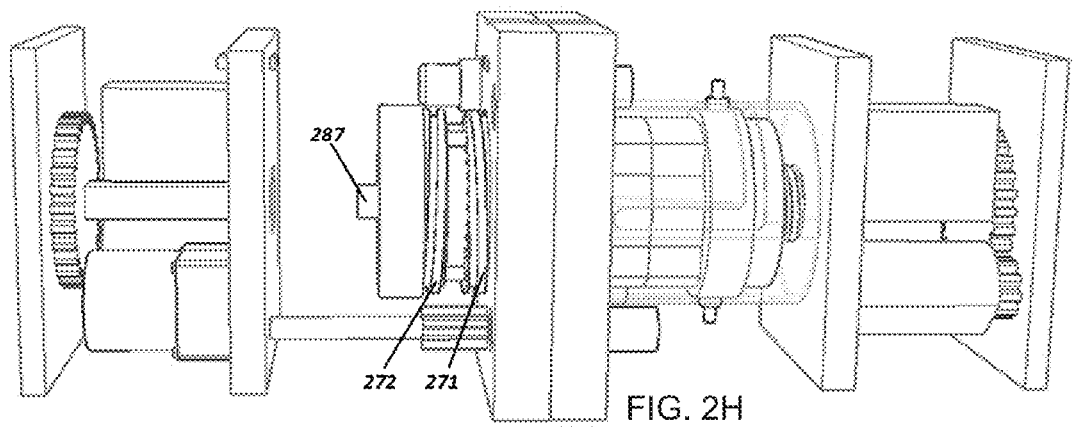
FIG. 2H shows the inner end of the connecting rod has an axle stub at the forward end (near the port) of the screw.

After the 90 degree turn, the solenoids are deactivated, and the clutch pins retract to return to their normal resting inner positions allowing the connecting rod and receiving rod to move again towards the ports until the inner surface of the front end of the connecting rod to lock on to the back surface of the female port's front wall (see FIG. 2G). This also will move the 10 mm slack to the male port side. To tighten this slack, the high torque motor 231 (FIG. 2G) turns the shaft 233 (FIG. 2G) through its gear reduction box 232 (FIG. 2G) which also allows the output shaft of the motor to be located at an off-center position where such position is needed due to spatial requirement in placing the motors. The shaft 233 turns the expansion gear 273 through the small gear 234. Inside the expansion gear are two expansion rings 271, 272 FIGS. 2D and 2H) which have outer threads but in opposite turn directions. Specifically, one ring has CCW threads while the other has CW threads so that when engaging outer expansion gear turns in CCW against these two rings causing them to extend outward resulting in an expansion operation. When the gear turns in CW against these two rings will cause them to go inward resulting in a contraction operation. In FIG. 2D, the outer expansion gear is removed to show the two expansion rings in their most contracted state resulting in an end-to-end distance of 20 mm, which is the same as the width of the expansion gear as shown in FIG. 2F. In these 2 drawings, 4 round pegs (only 3 are visible, 235, 236, 237) extend from ring 272, through holes in ring 271 (this ring is made a little transparent in FIG. 2D to show that this is the case) into the front wall of the male port. The four pegs are there to prevent the two rings 271, 272 from turning at the same time as they slide inward (contract) or outward (expand). Each ring has a width of 10 mm, and their threads have a pitch of 8 mm, meaning that when the expansion gear is turned ⅝ of a turn or 225 degrees, each ring will expand outward 5 mm for a total of 10 mm, and the expansion gear itself will move 5 mm. This 10 mm is the slack that is on the male port side as noted above, which is now taken up by the expansion of the rings. Further turning the expansion gear will cause tightening of the connection lock. The high torque motor has a built-in torque sensor, which, together with the strain gauges mentioned above allows the motor to tighten the connection lock to a known strength. The electronic control unit will continuously monitor these sensors and will command a re-torque if connection is losing strength.

Matching of Male and Female Coupler Units.

Figure 3:
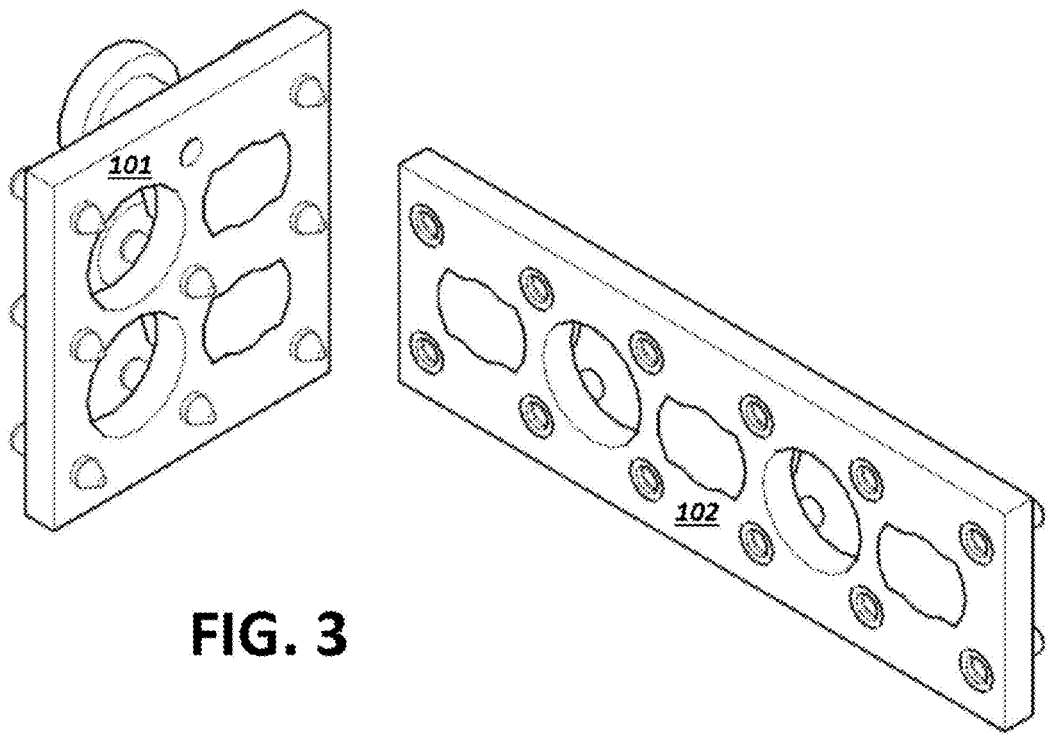
FIG. 3 shows a schematic drawing to illustrate the matching of the male and female coupler units.
Figure 4:
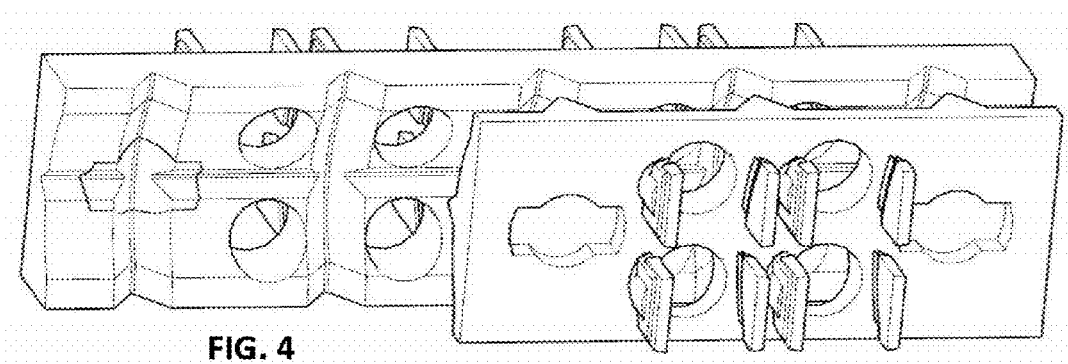
FIG. 4 shows a schematic drawing to illustrate the matchability of modular couplers having different sizes.

The modular coupler unit of this invention will have the following unique feature: the couplers of different sizes can still match and do it possibly in more than one configuration. This will be illustrated with the following example. In this example, the female mechanical port will be designated by "M", the female electrical port will be designated by "E", the male mechanical port by "m", and the male electrical port by "e". A larger female coupler having three mechanical ports and two electrical ports arranged in a horizontal linear fashion, envisioned as "<M-E-M-E-M>" is to couple with a smaller male coupler unit envisioned as "<e-m-e>". Mating the two coupler units would match up in 3 different positions: (1) center to center position: the two center mechanical ports line up and the four electrical ports will also line up and mate; the two side M ports of the larger coupler will be left unmated; (2) center to right side position: the center m-port of the male coupler lines up with the M-port on the right side of the female port. In this case, the remaining e-port of the smaller male coupler will be left unmated; (3) center to the left position: this is the mirror image case of (2). In the off-center mating case of (2) and (3), the unmated e-port will simply have its cover remain closed and not participating in any electrical connection. This matchability of couplers of different sizes is possible whether the horizontal spacing (DIM A) of the mechanical port and electrical port is same or different as long as the spacing of the combined pattern of the two parts are configured in a regular matchable manner. Refer to FIGS. 3 and 4 for drawings on matchability of modular couplers having different sizes. Note that 2 of the 3 cases result in off-center coupling. There is no conceptual problem for off center coupling if these couplers are used as lateral couplers joining vehicles side by side. However, it may presents a conceptual problem as to how the combined vehicle would be driven reliably if the two vehicles are joined in a fore-and-aft off-centered manner. Wellborn et al. in U.S. Pat. No. 8,627,908 discloses methods for a self-propelled trailer to follow its parent vehicle without hard mechanical connection, the same method can be enhanced to allow any self-propelled vehicle to follow another vehicle coupled in an off-centered manner.

With reference to FIG. 3, a schematic drawing to illustrate different configurations of connectors within a coupling unit will now be discussed. As shown in FIG. 3, the drawing on the left shows a square orientation. The electrical connectors are shown as a round open hole window. The mechanical connectors are shown as the irregular shaped cutout. In the drawing on the right, the same four connectors are place in a straight line.

With reference to FIG. 4, a schematic drawing of an alternative embodiment of the coupler unit design will now be discussed. As shown in FIG. 4, the two mating surfaces contain complementary ridges and grooves, which provide for a self-centering. Also shown in this illustration are the dust covers, which are shown as open.

Figure 5:
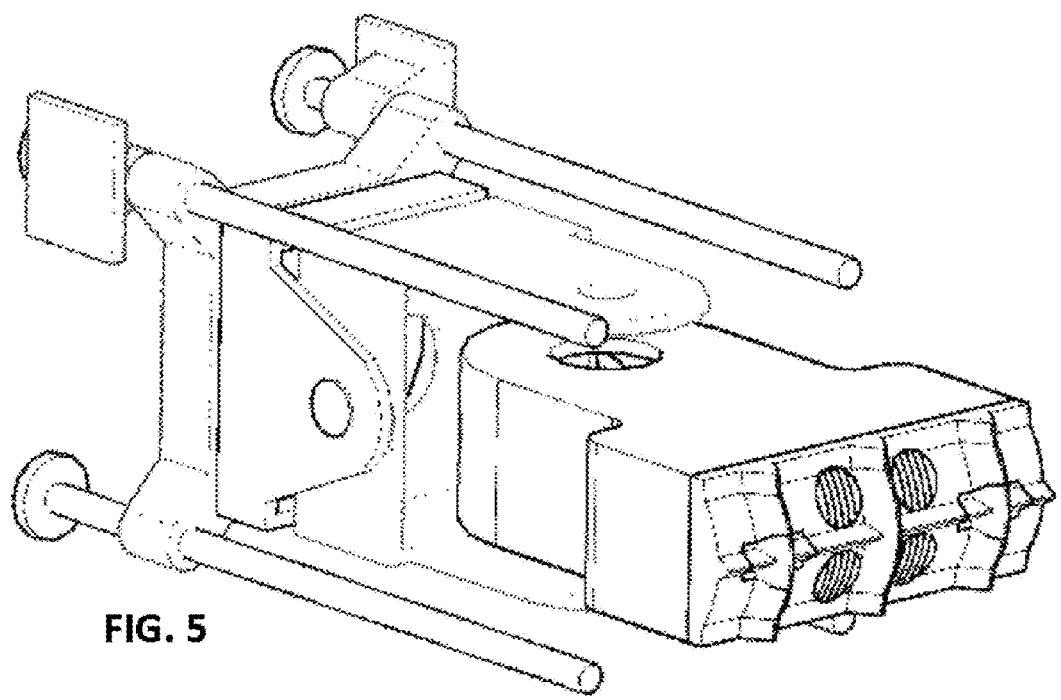
FIG. 5 shows the male part of the tongue and groove couple according to preferred embodiments of the present.
Figure 6:
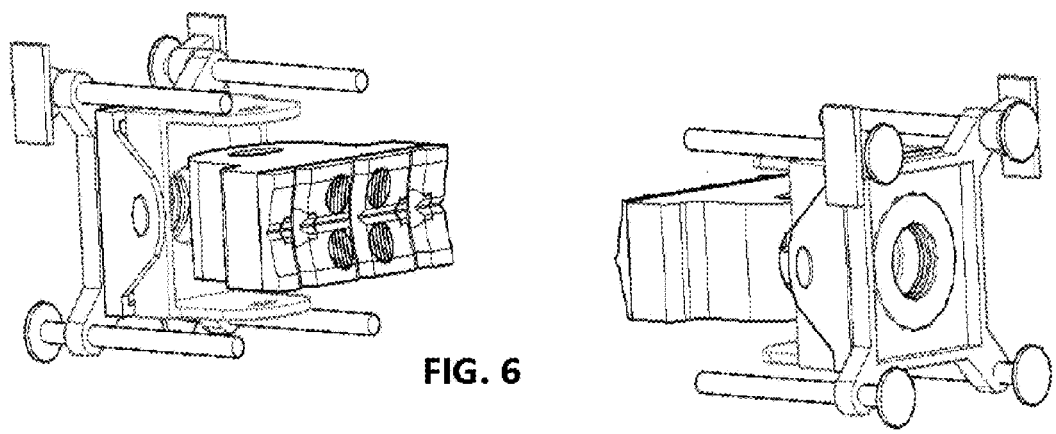
FIG. 6 shows both the male and female side of the tongue and groove couple design of the present invention.

With reference now to FIGS. 5 and 6, a preferred combination of vehicles of the present invention utilizing the tongue and groove coupler will now be discussed. As shown in FIG. 5 shows the male part of the tongue and groove couple according to preferred embodiments of the present invention. As shown in FIG. 6 shows both the male and female side of the tongue and groove couple design of the present invention. Note that the harness is similar in construction to a mechanical universal joint and it permits rotation around all three axes. Also note that there is a circular opening in the center of the harness of both the male and female coupler unit through which the power cable is led. The four post act as guides for the two coupler units to extend and contract.

Here the articulated mounting harness that supports the modular coupler design in this invention in a fore-and-aft automated connection will be described. This articulated mounting harness is motorized and, together with the usage of an all-wheel active suspension system, an all-wheel steering system and an all-wheel driving system on the vehicles in the embodiments of this invention, helps to precisely control the position of the coupler body as well as hold it steady during the automated coupling process.

Figure 7A:
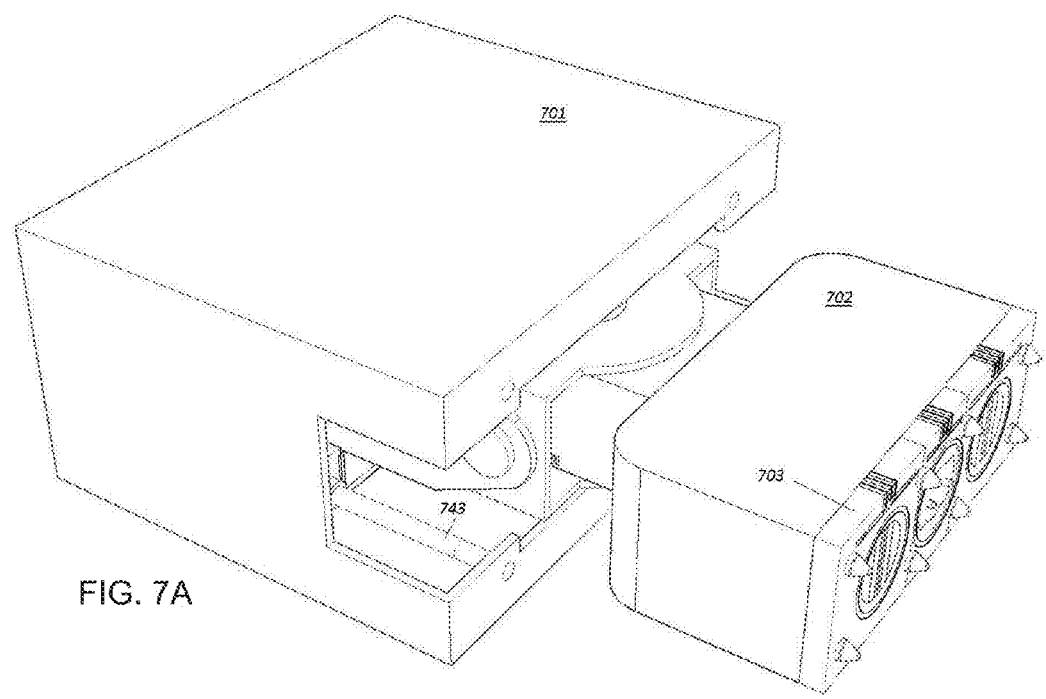
FIG. 7A is a schematic drawing of the articulated mounting harness that supports the modular coupler design in this invention in a fore-and-aft.

With reference now to FIG. 7A, the articulated mounting harness mechanism is housed inside a metal frame 701 suitable for mounting to the chassis of a vehicle in a fore or aft position at the normal (standardized) bumper height so that the coupler body 702 with its front coupler face 703 facing outward can be extended out of the vehicle body for an automated electrical and/or mechanical connection through the appropriate ports as previously described. The coupler body depicted in FIG. 7A is a 3-port design with a mechanical port in the middle and an electrical port on either side. As previously described, this coupler face can be mated to a matchable coupler of the same design with same or different number of ports. For the purpose of illustration, the coupler body 702 in the drawings is already in a partially extended position.

Figure 7B:
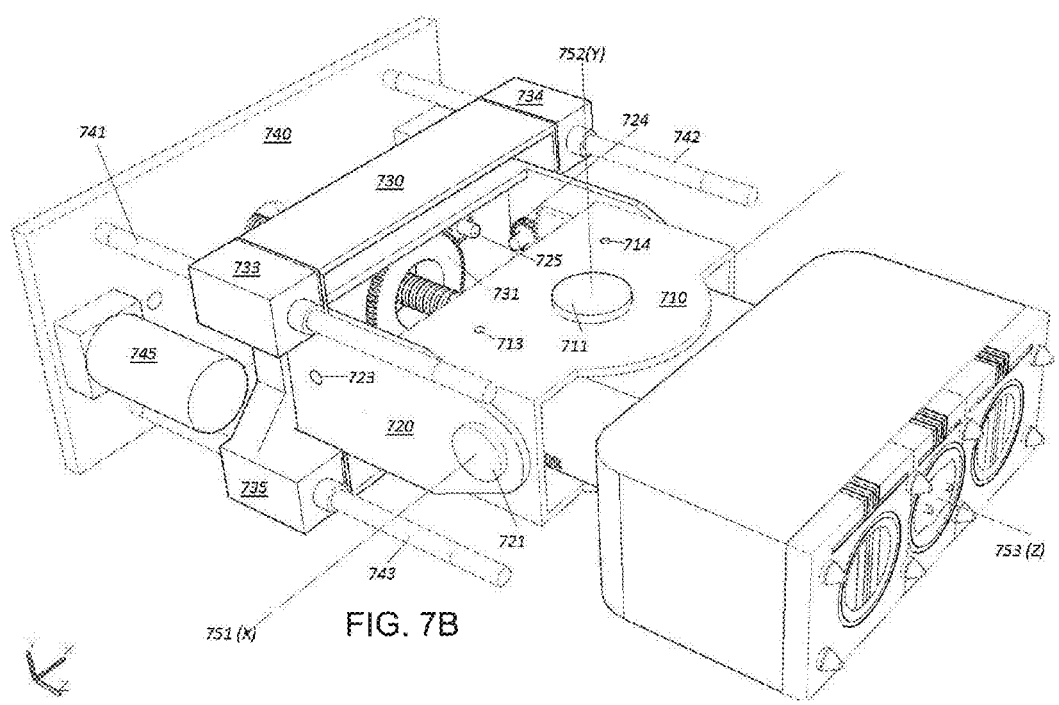
FIG. 7B shows the internal structure of the articulated mounting harness that supports the modular coupler design in this invention.

In FIG. 7B, the outside enclosure is removed to show the articulation mechanism inside. This articulated harness is motorized to move the coupler body in 4 modes: 3 rotational modes around the x, y, z axes and a linear mode to extend or retract the coupler body. To further clarify the coordinates system in the following discussion, a coordinate axes symbol is included at the lower left corner of FIG. 7B as well as three thin line marked as 751, 752 and 753 to locate the origin of the turning movements in the following discussions. As depicted, the positive direction of y axis points upwards and the positive direction of z axis is in the direction of coupler extension and positive x-direction points to the side so that the 3 axes form a right-hand ruled coordinate system.

The 3 turning modes are implemented in three stages. The first stage 710 turns the coupler body 702 around the y-axis with 2 rings 711 (top) and 712 (bottom, not seen in FIG. 7B), through which, the coupler body is rotationally engaged. This turn mode is normally termed as the yaw movements of the vehicle and is closely related to the steering and turning movements. As the maximum turning angle of the steering system used in the vehicle embodiments of this invention is 30 degrees, the maximum turning angle in the y-axis mode of the articulation is also set as +/−30 degrees.

Figure 7C:
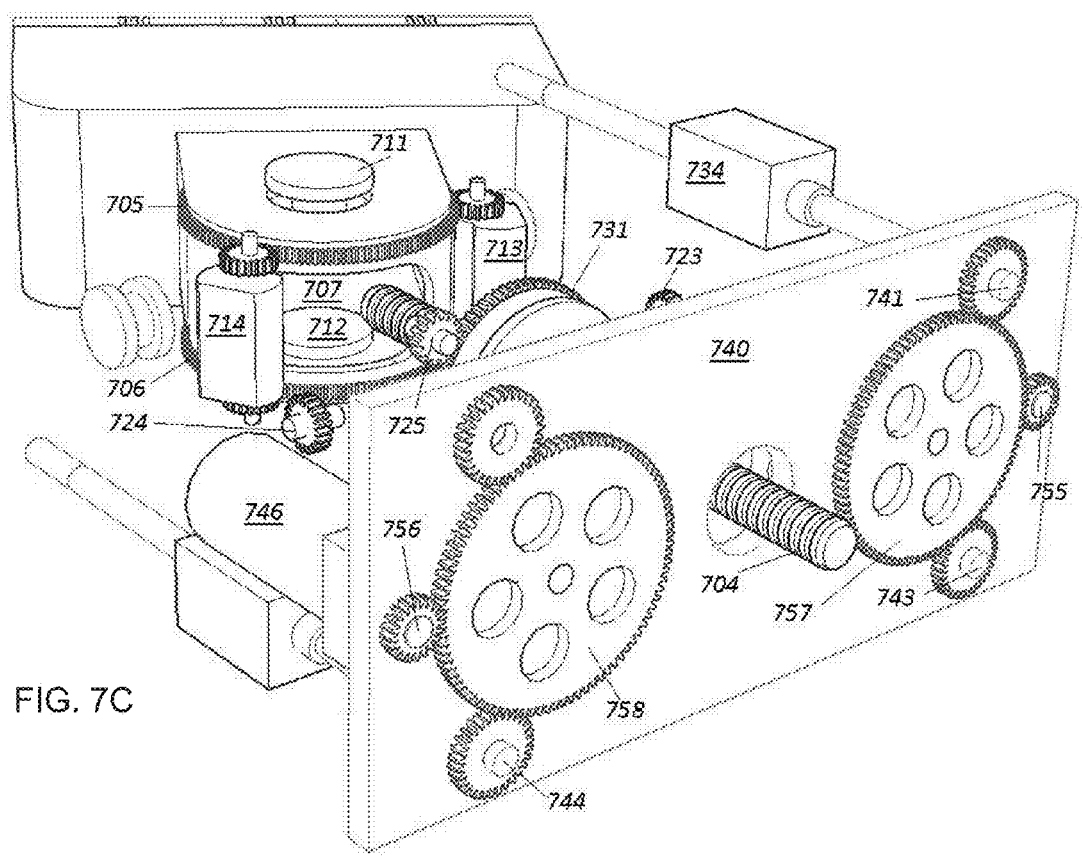
FIG. 7C shows a back view of the articulated mounting harness with some view-obstructing components removed in which the 3 modes of the rotational movements are depicted.

The first stage 710 is rotationally engaged to the second stage 720 around the x-axis via the two rings 721 and 722 (not seen in FIG. 7B but shown in FIG. 7C). The second stage 720 is rotationally engaged to the third stage 730 around the z-axis via a single geared ring 731 in the center. This geared ring 731 has a large center cutout through which the electrical cable 704 (FIG. 7C) from the electrical ports in the coupler body goes to the inside of the vehicle for power routing and distribution.

Also seen in FIG. 7B are 4 threaded screw shafts (threads not shown), 741, 742, 743 and 744 (not seen in FIG. 7B but shown in FIG. 7C) on which the third stage 730 rides through threaded sleeves of the 4 snubber units 733, 734, 735 and 736 (not seen in FIG. 7B but shown in FIG. 7C). (A detailed depiction of these snubber units are presented in FIG. 7E).

These 4 shafts 741, 742, 743 and 744 are anchored to and supported in the front by the enclosure which is removed for the clarity of the drawings. In the back they go through the fixed plate 740 and can be turned by the two large high torque motors 745 (FIG. 7B) and 746 (FIG. 7E) through the idler gears 757 and 758 (FIG. 7E). As these shafts turn, they move the third stage 730 through the snubber units 733, 734, 735 and 736. The movement of the third stage 730 in turn the second stage 720 through the coupling of the geared ring 731. The movement of the second stage 720 moves the first stage 710, which in turn moves the coupler body 702 linearly along the z-axis.

Figure 7D:
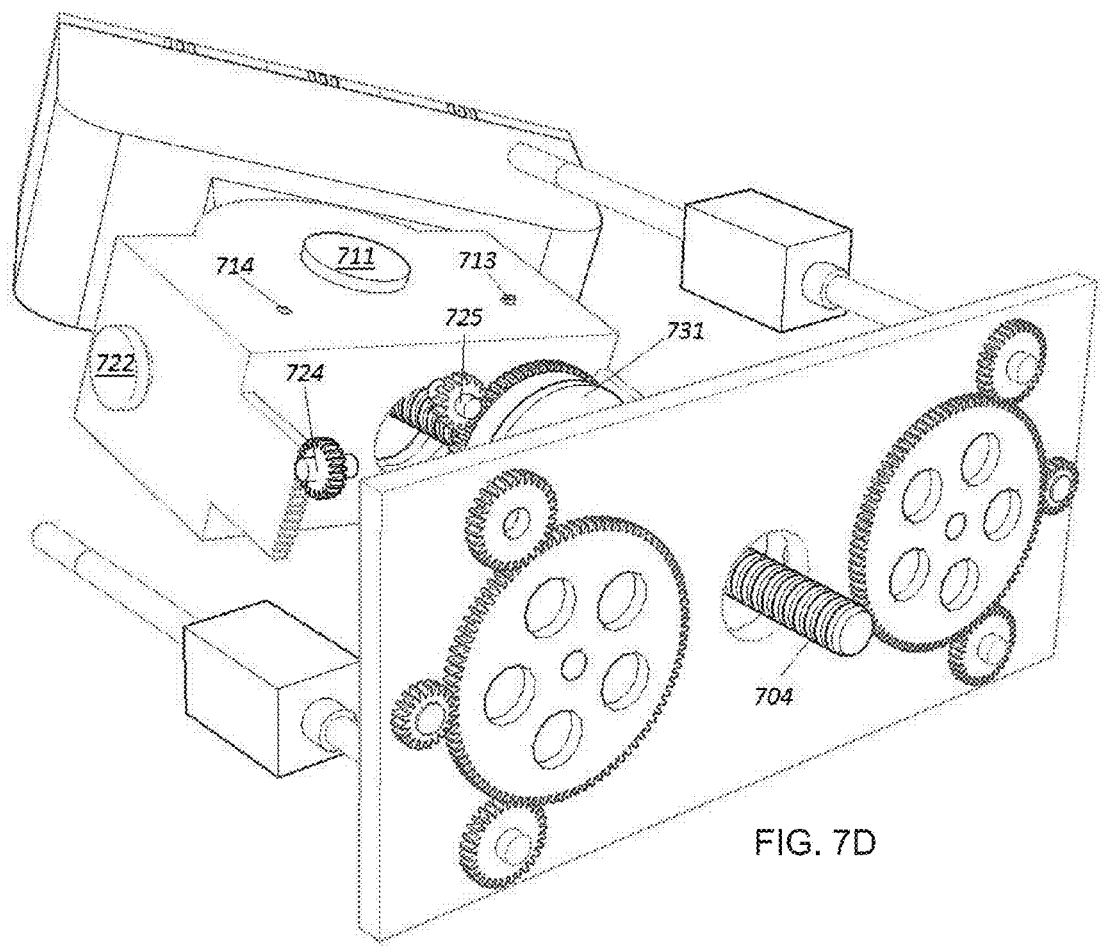
FIG. 7D shows a back view of the articulated mounting harness with some view-obstructing components removed in which the 3 modes of the rotational movements are depicted.
Figure 7E:
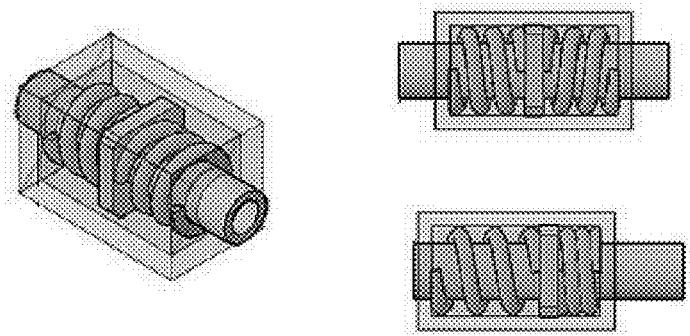
FIG. 7E shows a detailed depiction of the snubber units.

The 3 modes of the rotational movements are described in FIGS. 7C and 7D which are back views of the articulated mounting harness with some view-obstructing components removed. In FIG. 7C, the coupler body is turned −30 degrees around the y-axis (the yaw movement) by the two motors 714 and 713 anchored inside the first stage 710 whose body is removed for the view. The ends of the two motor shafts can be seen in FIGS. 7B and 7D labeled as 714 and 713). The rear end of the coupler body is shaped into a half circle and the top and bottom rims of this half circle are fixed with gear tracks, 705 and 706 (FIG. 7C), which are engaged to the corresponding gears of the motors, 713 and 714 (FIG. 7C) allowing the motors to turn the coupler body around the y-axis.

Please also note that the rear end of the coupler body in between the half circle rim gears has an oval cutout 707B which allows the coupler body making those +/−30 degrees turn without excessively bending the thick electric cable 704. A half round plastic plate (not shown) that is capable of sliding around and covering the oval slot while keeping the cable in its center position can help to seal the cutout and further protect the cable by preventing the cable to rub against edges of the cutout.

The active rotations around the x-axis and around the z-axis are performed by two motor sets both of which are anchored inside the frame body of the second stage 720. The motor bodies of these motor sets are not shown in FIG. 7C and FIG. 7D for clarity. Only the motor shafts and the motor gears are shown to indicate the location of the motors. The frame body of the second stage 720 is also not shown for the same reason and its position in the movements can be inferred by the positions of the motor sets as they are anchored inside the frame body of the second stage 720. The frame body of the third stage 730 (FIG. 7B) is not shown in FIGS. 7C and 7D either; but the third stage does not move with any of the 3 rotations; its role is to perform linear movements (extend and retract) of the first 2 stages and the coupler body and to provide the anchor point of the geared ring 731 (FIG. 7B) which is an integral part of the third stage and on which the second stage 720 is rotationally engaged through a bearing (not shown) on the geared ring 731. The motor set, 725 (FIGS. 7B, 7C and 7D) and 726 (not seen in the Figures but located directly opposite to 725 on the other side of the geared ring 731 and engaged with the same. (The locations of the gears and shafts 725 and 726 are offset from the horizontal position as their motors would have spatial conflicts with the motors 723 and 724 nearby.) As the frame body of the second stage 720 is free to turn against the geared ring 731 which is fixed integrally with the third stage 730, turning the gear set 725 and 726 turns the frame body of the second stage 720 itself around the z-axis. The frame body of the second stage is shown to turn the maximum +10 degrees around the z-axis in FIG. 7D from its normal center position in FIG. 7C. (There are stops (not shown) on the third stage 730 to prevent the second stage from turning more than the maximum degrees allowed.) This turn around the z-axis can be seen by comparing between the FIG. 7C and FIG. 7D the positions of the previously mentioned gear sets inside the frame body of the second stage.

The active rotation around the x-axis is performed by the gear motor set 723 (whose shaft anchor point on the second stage frame body is seen in FIG. 7B and whose motor gear is partially shown in FIG. 7C) and 724 (FIG. 7C also partially shown in FIG. 7B). The motors of this set are not shown in the figures as previously mentioned. This gear set, as seen fully in FIG. 7D, is engaged, in a rack-and-pinion fashion, to the edge gears on an extension of the side (the ring 722 side) of the frame body of the first stage 710. The other side (the ring 721 side) has a similar arrangement (not shown). The edge gears on the frame body of the first stage 710 is not straight but is on the circumsphere of a circle which is concentric to the rings 722 and 721, through the centers of which runs the x-axis. The orientation of the x-axis (and y-axis) in FIG. 7D has been changed from that in FIG. 7C due to the rotation around z-axis as mentioned before. By turning the gears 723 and 724 against the corresponding edge gears in a rack-and-pinion fashion turns the frame body of the first stage 710 relative to the second stage 720 around the x-axis which runs through the center of the rings 722 and 721. FIG. 7D shows that the first stage 710 has been rotated −10 degrees (an upward tilt) around the x-axis by the second stage 720 and as a result of that the first stage has a combination of rotations around both the x-axis and z-axis while the coupler body has an additional turn around the y-axis.

As mentioned in the description of the electric and mechanical ports, all the motors in the first and second moving stages of this actively articulated mounting harness embodiment are controlled by a local electronic control unit (ECU) located near the motors preferably with local battery storage with power and signal feeds from the electric cable 704 which runs through the stages. As the cable 704 runs through the holes or cutouts in the stages, plastic inserts will be used to center the cable to prevent it from rubbing excessively against the edges of the openings around it.

The active articulation of the mounting harness is mainly used during the coupling process helping to keep the coupler bodies in a stable position for mating. After the coupling is completed and the couplers are connected, the active articulation is no longer needed and can be turned off. However, when two freely articulated units are coupled, there are too many degrees of freedom left, which may result in many unwanted rotations and swinging, when that happens the active articulation can be turned on to help to keep those unwanted movements in check.

Figure 7F:
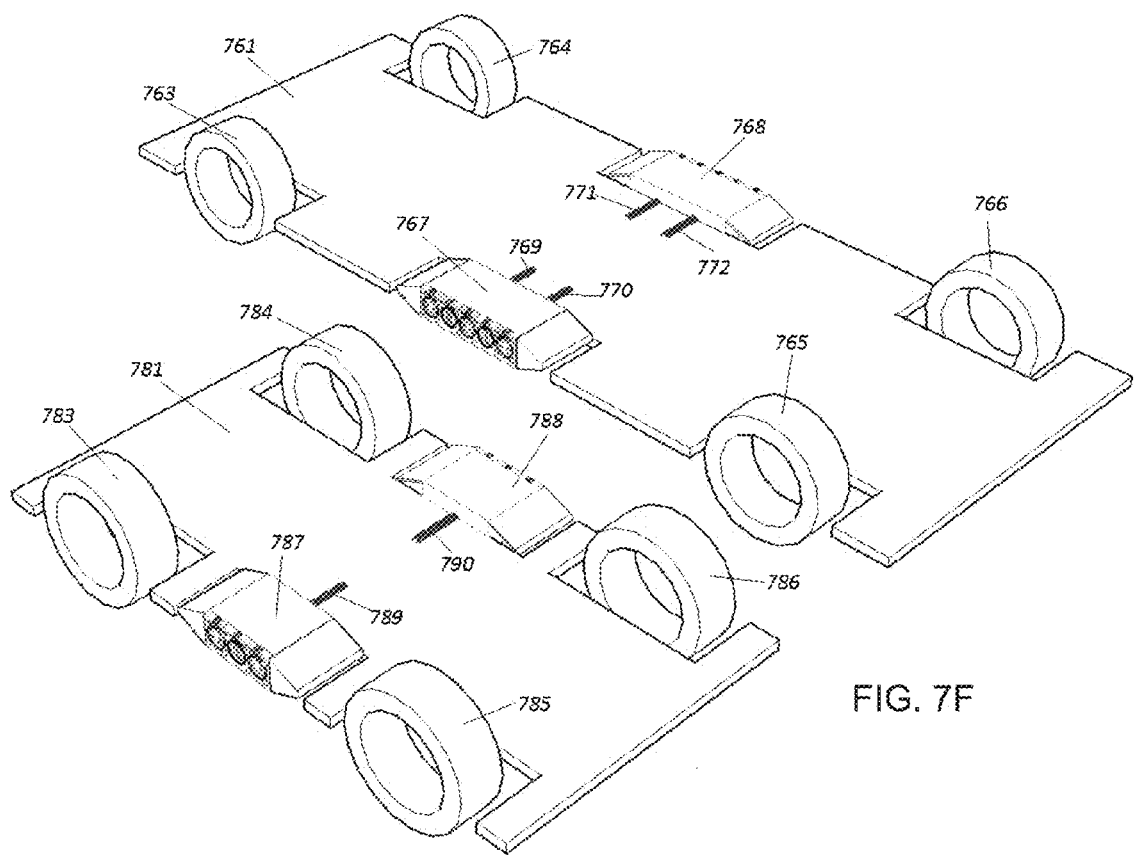
FIG. 7F shows a front vehicle mounting harness and a rear vehicle mounting harness in which two vehicles are shown to be close to each other and ready to approach for the coupling process.
Figure 7G:
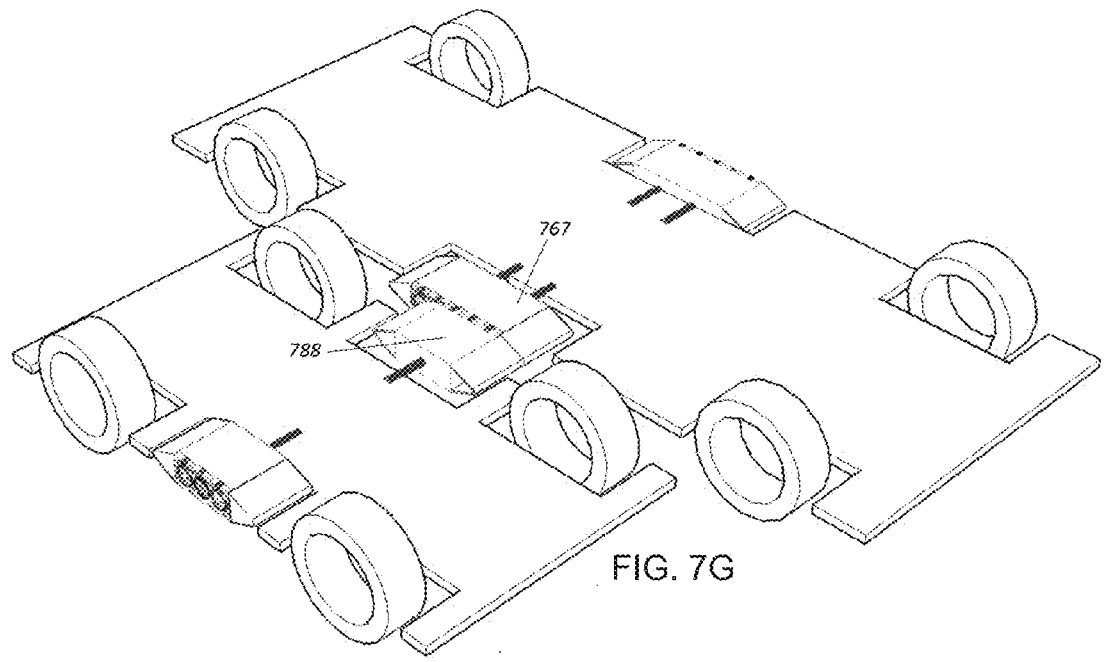
FIG. 7G shows a smaller front vehicle with mounting harness and a larger rear vehicle with mounting harness in which two vehicles are shown to be undergoing the coupling process.
Figure 7H:
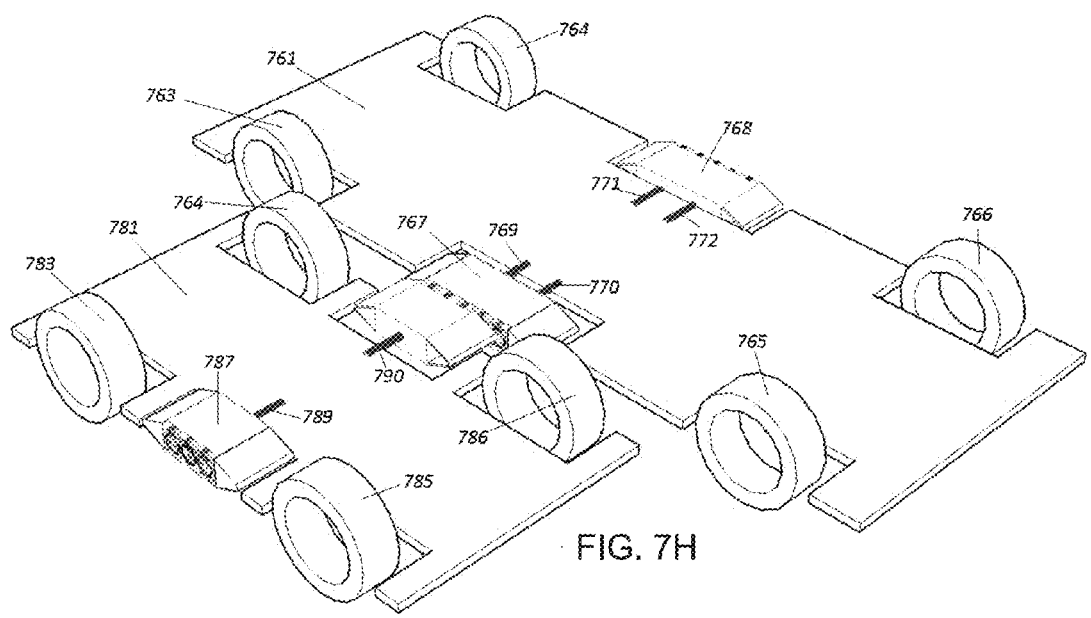
FIG. 7H shows a smaller front vehicle with mounting harness and a larger rear vehicle with mounting harness in which two vehicles to be undergoing the coupling process.

With reference now to FIGS. 7F, 7G, and 7H, the mounting and connection of lateral couplers will be described and discussed. In the preferred embodiment of using all wheel active suspension and all wheel active steering and all-wheel drive for the vehicles participating in the lateral coupling for the purpose of sharing electrical energy in this invention, a articulated mounting harness for the lateral coupler is not needed. A simple motorized screw extension unit housed inside the wind shrouds at the two side of the coupler with the other end of the extension units attached to the chassis of the vehicle through a mounting arrangement strongly rubberized or spring loaded to allow some limited flexibility would suffice as a mounting harness for the lateral couplers. As many known mounting device can be used for this type of simple mounting, the purpose of FIGS. 7F through 7G is to show the approximate dimensions and locations for a lateral coupling.

As the wheels which have in wheel active suspension units are necessarily large in size, in FIGS. 7F through 7G, the vehicles large or small are all shown to have large wheels using the tire size of the Michelin Active Wheel, 215/35R1 as a base for the scale of the drawings. Also standardizing on the wheel diameter size reduces the need for the mounting harness of the coupler to adjust the mounting height of the coupler for the coupling process. On the other hand, it is a little wasteful or costly for smaller vehicles to have a large wheel. Therefore, larger vehicles like a bus will need to have adjustable height mounting harness to make it more universally connectable.

In FIG. 7F, the two vehicles are shown to be close to each other and ready to approach for the coupling process. In an all-wheel steering case, the vehicles would reduce their lateral separation using a small crab angle (not shown in the drawing). This will be further discussed in the coupling process. The large vehicle is fitted with a 5-port M-E-M-E-M lateral coupler while the smaller vehicle only have room for a smaller 3-port M-E-M coupler, this would presents no problem to modular coupler design in this invention. As shown in FIG. 7G and FIG. 7H, the two vehicle can still connect and furthermore, the connection.

Switching and Distribution of Electrical Power.

Electrical circuits for this topic involve cables, wires, switches and directions of electrical power flow. Although cables and wires are inherently bidirectional flow carriers, the electrical power, whether direct current (DC) or alternate current (AC), flows at any moment through any point in cables and wires in only one direction. Specifically, it flows from a source (supply) to a destination(s) (demand). This direction and the flow rate is controlled dynamically by computer-controlled switches. For each circuit, this electric power flow is usually carried by more than one wire. For a high voltage DC circuit, this is a 2-wire cable, one active, positive "current" and the other the ground return. For an electric vehicle running on a high voltage battery pack, the battery pack always supplies the electric power as direct current at its output terminals to its driving motor control unit regardless whether the electric vehicle's driving motor or the motor/regenerative braking generator is running in DC or AC mode. It is at this battery to the electric vehicle's driving motor control unit connection where the power distribution unit is inserted to perform its electrical power switching and routing function for the dynamic highway energy sharing scheme in this invention.

For the preferred embodiment, all circuit switching and routing will be performed by a mechanical relay switching device, which we refer to as the power distribution unit. The power distribution unit is under control of the vehicle's electronic control unit. When switched and connected through electro-mechanical relays in power distribution unit, the operation of the motor controller would be independent of the whether it is receiving power directly from the battery or from another vehicle through the coupler assemblies. Specifically, the resistance and voltage drop would be the same and negligible. The electronic control unit will monitor the cable temperatures through thermal sensors attached to the cables at multiple locations in order to prevent cable overheating and melting. Each electrical port and power cable with have a limit in terms of electrical current flow. If the demand exceeds that limit, multiple ports and cable connections will be used by the power distribution unit. Large vehicles and specialize vehicles may be equipped with more than two electrical ports to further increase the total electrical current flow. The electronic control units will also determine the shortest paths between electrical power sources and demand locations to minimize possible voltage drop and instruct the power distribution unit to make the appropriate connections. Vehicle embodiments in this invention for electrical power sharing will be designed with the battery outputs capable of twice the discharge rate than would be the case with a conventional electric vehicle so that the vehicle can share its battery power with another vehicle, i.e., to drive 2 vehicles at the same time, without exceeding the capabilities of the battery pack. The total energy available is increased by the regenerative braking and the possibility of one or more vehicles in a cluster to have an onboard fossil fuel engine generator capability.

Figure 8A:
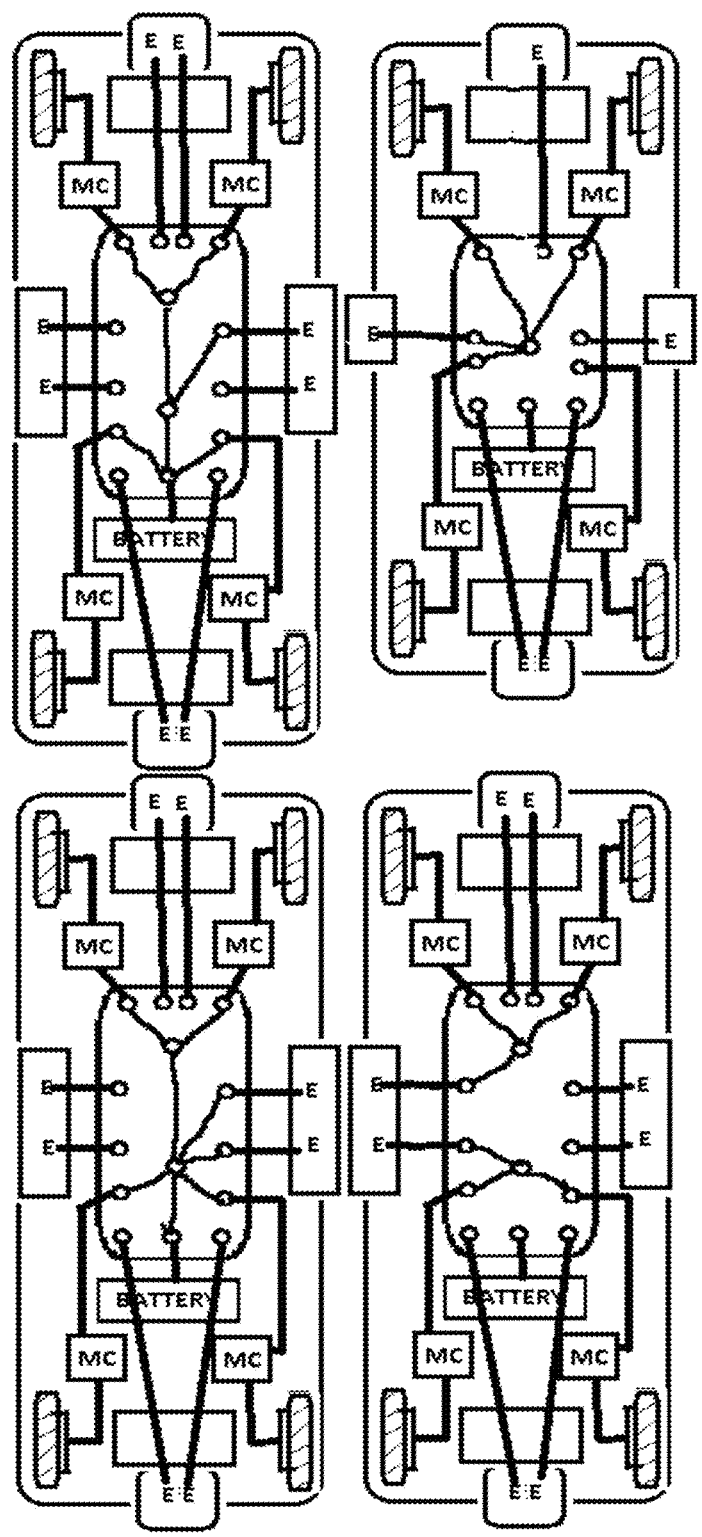
FIG. 8A is a schematic illustration of a combined vehicle connections.
Figure 8B:
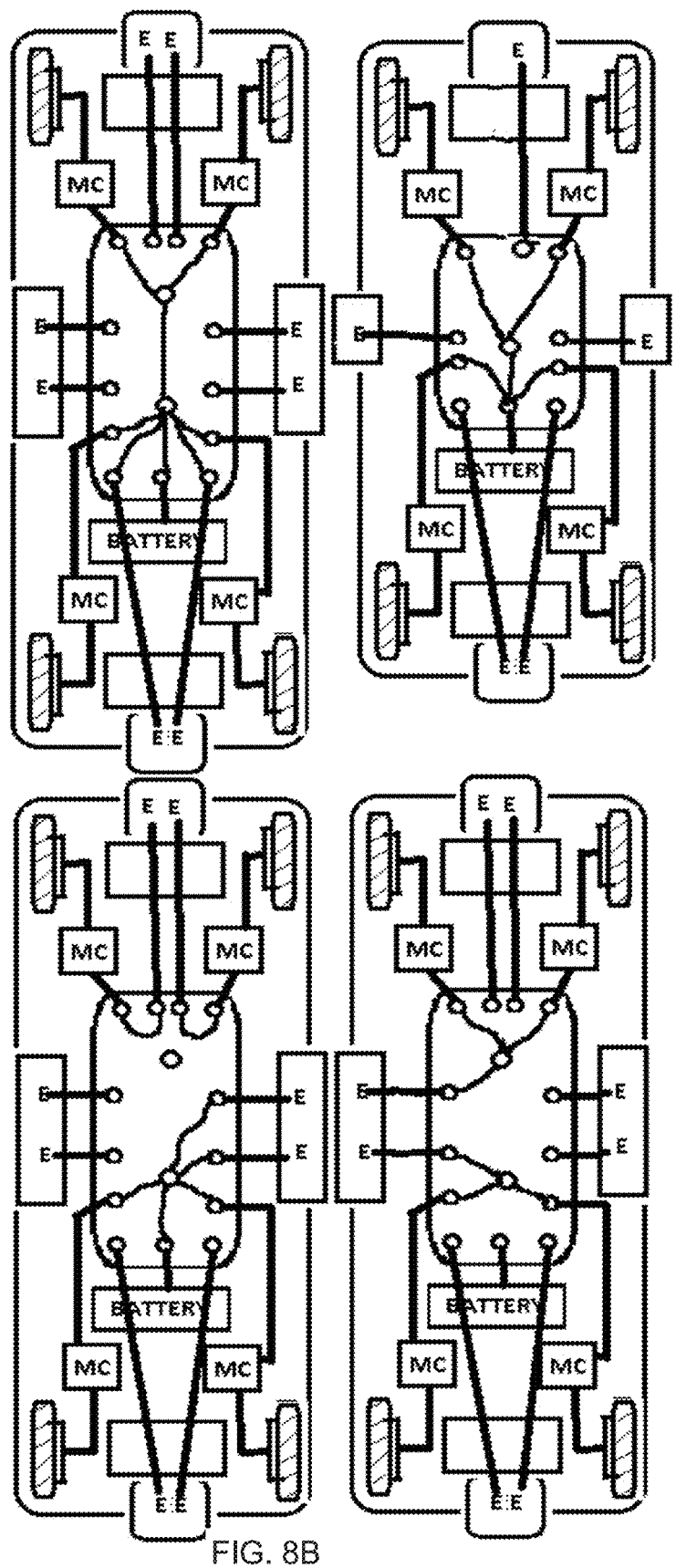
FIG. 8B is another schematic illustration of alternative combined vehicle connections.

With reference now to FIGS. 8A and 8B, the four different vehicles are labeled as VA (upper left hand corner), VB (lower left hand corner), VC (upper right hand corner), and VD (lower right hand corner. They are coupled together in a two by two array. Each vehicle is equipped with four coupler assemblies, with one each side of the vehicle, and a power distribution unit, which is shown in the center of each vehicle and to which all of the electrical power sources or destinations are connected, and an electronic control unit, which is controlling the power distribution unit but which is not shown in the figures four active driving wheels, which are under the direct control of separate motor control units. While the coupler assemblies will contain electrical ports and mechanical ports, the mechanical ports are not shown to simplify the diagrams and to emphasize the electrical current flow. These motor control units are shown as "MC" in the figures. Vehicles VA, VB, and VD are the same size while VC is smaller in size. Referring to FIGS. 8A and 8B, without loss of generality, let us assume that all four vehicles are going 60 miles from X to Y in 1 hour at 60 miles per hour speed and the electric energy consumption for the journey typical for a large or medium sedan size EV is 0.33 kwh per mile or a total of 20 kwh for the 60 mile journey. At the start of the journey, VA and VB each have 40 kwh of battery energy, meaning that they can finish the journey and still each having 20 kwh of battery energy left over. On the other hand, let us assume that VC has only 15 kwh battery energy, and VD has 5 kwh at the start, meaning that neither VC nor VD can complete the 60 mile journey without having to stop at a charging station for additional charge. However, the total energy of these 4 vehicles together is the sum of 40+40+15+5=100 kwh, which is enough for all 4 to finish the journey and still have 5 kwh per vehicle left over. By clustering these 4 vehicles together and sharing these 100 kwh among them, all of them can reach the point Y without stopping for recharging. There is a number of ways to divide this 80 kwh among them. Again without loss of generality, let us assume that the 100 kwh of total energy are shared in such way that each of the 4 vehicles will have 5 kwh (¼ of the 20 kwh total) left when they reach the point Y so that all of them could go on their separate ways for another leg of journey where they would seek other energy donors to increase their range without stopping. Given this sharing target, there is also a number of way to switch and route the electric power among them during that 1 hour. One scheme would be, during the first half hour, VA would supply the energy to drive both itself and VC while VB does the same with VD. The connections to implement this scheme is shown in FIG. 8A. The sustained electric power flow rate across the coupler from VA to VC is 20 kw; which is well within the capacity of a DC fast charger like CHAdeMO. The flow rate across the coupler from VB to VD is also 20 kw. Thus, at the end of the first half hour, we have the following remaining energy level: VA=40−10−10=20 kwh, VB=40−10−10=20 kwh, VC=15−0=15 kwh, VD=5−0=5 kwh. Note that neither VC nor VD has used its battery during this half hour. During the second half hour, VA stops supplying energy to VB altogether and switches and routes its battery to supply the two front wheels of VB while it continues to supply energy to all of its own four wheels. VB continues to supply full load to drive VD while only supply energy to its own two rear wheels. The connections to implement this scheme in the second half hour is shown in FIG. 8B. The electric power flow rate across the coupler from VA to VB is 10 kw, while the flow rate across the coupler from VB to VD remains at 20 kw. Thus, at the end of one hour, the battery levels are at VA=20−10−5=5 kwh, VB=20−10−5=5 kwh, VC=15−10=5 kwh, VD=5−0=5 kwh, and all vehicles have arrived at point Y. What may not be obvious from this energy distribution system is that each drive wheel is separately powered and that the required power can come from any source be it internal within the vehicle itself for be supplied from other vehicles. That means one vehicle's drive wheels could be powered from several different vehicles simultaneously. What may not be obvious from this energy distribution system is that each drive wheel is separately powered and that the required power can come from any source be it internal within the vehicle itself or be supplied from other vehicles. That means one vehicle's drive wheels could be powered from several different vehicles simultaneously.

Process of Coupling.

It is normally assumed that the coupling process is attempted or initiated in a clear and straight line section of the road where the speed of the vehicles can be held relatively constant and when half-extended, the couplers can be clamped with its ends extended out with support at the end of the coupler body in this embodiment to help reduce the structural vibrations. (A coupler body will have a more severe vibration issue if not clamped to the frame of the vehicle body). At highway speed, where a small expected turn during the approach can be accommodated by a corresponding adjustment of the couplers. At slower speed in city roads, a larger and expected turn up to range of adjustment of the couplers at the halfway out position (see FIG. 10) during the approach can also be handled the same way. It is further assumed that weather conditions are such than visual communications are possible at distances of separation of the two vehicles of greater than 10 meters. The driver (or the main electronic control unit if fully automated) searches for or has made prior arrangements with possible vehicles or vehicle clusters with which to couple based on the other vehicle's energy state, travel plans, coupler arrangements, and its characteristics. For the remainder of this section, vehicle will refer to either a single vehicle or several vehicles which are coupled together. Once a likely vehicle for coupling is located (or pre-planned), the two vehicles under driver control (in this invention, we do not assume nor require fully autonomous driverless transportation systems) begin to approach each other to within the range of direct vehicle to vehicle wireless communication, if they are not already able to communicate. When fully automated driving is perfected and permitted, these vehicles will be under computer-control from the beginning. The methods of communication could consist of WIFI or other wireless methods. Upon establishing vehicle to vehicle communication, the position and location of coupling between the two vehicles is negotiated. This would include either fore and aft coupling or side by side coupling as discussed separately below. This would also include the position of each vehicle relative to each other. At this point in the coupling process, the driver may be assisted by the vehicle's electronic control units.

Case 1

Process of Coupling Two Vehicles Together where Both have Standard Articulated Harnesses and which Will Connect in a Fore and Aft Configuration Leading to the Articulated Coupled Case For the purpose of this illustration, the leading vehicle or vehicle cluster will be referred to as vehicle F, and the following vehicle or vehicle cluster will be referred to as vehicle A. Therefore, the coupler on the rear bumper of vehicle F will make contact with the coupler on the front bumper of vehicle A. In one configuration, the harness assembly may not be capable of extension. Under that limitation, only one of the two vehicles will extend and contract the harness assembly.

The path of the two vehicles to achieve coupling is negotiated and calculated by the main electronic control units of both vehicles so that vehicle A will be trailing vehicle F. If under manual control by a human driver, GPS like driving instructions of speed and direction are transmitted to the driver in terms of the path to be followed. If under computer control, the main electronic control unit transmits a sequence of commands and at the appropriate times to the drive wheel and steering subassemblies. Once either visual contact by the driver or camera contact is established, the two vehicles will continue on the same path at roughly the same speed. They approach each other so that the distance of separation is approximately ten meters. The two vehicles now maintain the exact same speed. At this point in the coupling process, if wireless communication cannot be established, the coupling process is aborted.

For the purposes of this description, it is assumed that from now until the coupling process is completed, vehicle F will maintain a constant speed and that all of the speed variations will be performed by vehicle A. Of course, a similar process would occur if vehicle A maintains a constant speed and all of the speed variations will be performed by vehicle F. It is also possible to accomplish the coupling process if both vehicles are changing speed. The critical aspects of the coupling process are the distance between the two vehicles and how this distance is changing with time in the process.

Otherwise, the electronic control unit ensembles of both vehicles activate the coupler bumper shields (if any) on the bumpers in order to expose the coupling system and activate the exposed coupler LEDs and coupler cameras on the various electrical and mechanical ports. Each LEDs of both the electrical or mechanical ports will be flashing at a distinctively recognizable and identifiable rate pre-negotiated between the main electronic control units of the participating vehicles to allow a computerized identification and confirmation of the target port(s) of the coupling. For example, different ports will be flashing at different frequencies of 1 to 10 flashes per second.

The vehicle A now accelerates to approach vehicle F to within the coupler system recognition distance, which is determined by the capabilities of the vehicles, the time necessary to adjust the various controllable parts, the weather conditions, and/or the resolving precision of the LEDs and cameras. This distance of separation would be approximately five meters. Vehicle A now slows down to match the speed of vehicle F and maintains a constant distance of separation as determined by inter-vehicular sensors. The cameras on the ports of both vehicles now will search for their target LEDs. Once recognition is achieved, the local electronic units, which are controlling the coupler systems, signal that the targets are acquired and assist and direct control of their respective vehicles. If such recognition is not achieved, the coupling process will be aborted.

Once the camera target acquisition is confirmed, the automatic computer-controlled approach phase is initiated. These LED-camera systems can provide an additional mode of communication between the two vehicles through the modulation of the LED flashing rate, e.g., sending Morse code flash sequences.

Over a period of two to three seconds, the harnesses now extend the coupler ports to their half extended position, which in this embodiment would be approximately 150 mm. Again, if recognition is not obtained within the two second time period, the coupling process is either aborted or repeated.

The electronic control unit ensembles constantly update the time to impact based on the distance of separation of the coupler systems and the speed and acceleration differential between the two vehicles. The speed of vehicle A is increased so that it approaches vehicle F at a speed difference of nominally 3.6 km per hour (or gaining on vehicle F in 1 meter per second). At this rate of differential speed, contact between the two vehicles will be made in five seconds. During these five seconds of approaching phase, the two vehicles will align the two coupler surfaces to a matching position as close as possible, using feedback from the camera sensors to provide the error signal to drive the active steering and or active suspension, as available. To assist in alignment measurements, two additional cameras are located at each end of the coupler unit and focused towards the harness, and one additional camera is located above the harness and is focused down onto the harness. There are horizontal stripes marking the sides and top of each outer surface of each port. These stripes are monitored by the various cameras.

As the vehicles are designed in the embodiment of this invention with active suspension also the joint motors in the articulated mounting harness embodiment in this invention can minimize or filter out as much noises due vehicle or harness vibrations.

When the distance of separation of the two coupler units is approximately one meter, vehicle A will initiate a rate of deceleration of approximately 0.1 G (approximately 1 meter per sec per sec). Vehicle F is still maintaining its constant speed. The electronic control assemblies calculate the horizontal and vertical adjustments of the harness to make proper alignment at the time of impact, the local electronic control unit makes the necessary adjustments, and then the motion of the harnesses is stopped by clamping the sides of the harnesses. The speed of vehicle A is carefully regulated so that at the point of contact of the two coupler assemblies, there is a small but positive relative speed difference. The diameter of the locator pins is nominally 20 mm cm. Because these pins are tapered, they are self-centering so that the target 0 for alignment engagement has a radius of 10 mm. The energy of impact is absorbed by the springs within the harness assembly. These compressed springs also maintain the contact between the two couplers. The proper match is determined by the contact switches, which lie in the bottom of the receptacle well and are depressed by the corresponding pins from the other coupler. If the match is confirmed, the electromagnets are energized.

The doors to the electric port are now opened. The electrical plugs and electrical sockets are extended towards each other and the process of connection is monitored by internal cameras and LEDs. Once the electrical connection is made and confirmed, the mechanical ports, if present, are activated. Once completed, the two vehicles switch on their respective electrical circuits and are ready to start sharing electrical power as appropriate.

Case 2

Process of Coupling Two Vehicles which Will Connect in a Lateral Configuration

For the purpose of this illustration, the left side vehicle or vehicle cluster will be referred to as vehicle L, and the right side vehicle or vehicle cluster will be referred to as vehicle R. Therefore, the coupler on the right side of vehicle L will make contact with the coupler on the left side of vehicle R. In one configuration, the harness assembly may not be capable of extension. Under that limitation, only one of the two vehicles will extend and contract the harness assembly.

After the negotiations have been made to identify the two vehicles which will be coupled as described above, the path of the two vehicles to achieve coupling is negotiated and calculated by the main electronic control units of both vehicles so that vehicle L will be traveling in the left lane and vehicle R will be traveling in the right lane. If under manual control by a human driver, GPS like driving instructions of speed and direction are transmitted to the driver in terms of the path to be followed. If under computer control, the main electronic control unit transmits a sequence of commands and at the appropriate times to the drive wheel and steering subassemblies. Once either visual contact by the driver or camera contact is established, the two vehicles will continue to travel side by side in the centers of the adjacent lanes at the same speed. The distance of separation of the two sides of the vehicles will be dependent upon the width of the lanes and the widths of the vehicles and will range from 2.5 meters to four meters. At this point in the coupling process, if wireless communication cannot be established, the coupling process is aborted.

Otherwise, the electronic control unit ensembles of both vehicles activate the coupler covers, if present, in order to expose the coupling system and activate the exposed coupler LEDs and coupler cameras on the various electrical and mechanical ports. Each LEDs of both the electrical or mechanical ports will be flashing at a distinctively recognizable and identifiable rate pre-negotiated between the main electronic control units of the participating vehicles to allow a computerized identification and confirmation of the target port(s) of the coupling. For example, different ports will be flashing at different frequencies of 1 to 10 flashes per second. The cameras on the ports of both vehicles now will search for their target LEDs. Once recognition is achieved, the local electronic units, which are controlling the coupler systems, signal that the targets are acquired and assist and direct control of their respective vehicles. If such recognition is not achieved, the coupling process will be aborted.

Otherwise, the electronic control unit ensembles of both establish wireless communications. Once the camera target acquisition is confirmed, the automatic computer-controlled approach phase is initiated. These LED-camera systems provide an additional mode of communication between the two vehicles through the modulation of the LED flashing rate, e.g., sending Morse code flash sequences. Each electronic control unit ensemble assumes control over the respective vehicle's speed and direction of travel so that the two vehicles are now travelling at the same speed and on parallel paths, and positioned so that the two coupler assemblies are opposite each other.

Over a period of two to three seconds and as possible, the harnesses now extend the coupler ports to their half extended position, which in this embodiment would be approximately 150 mm. Again, if recognition is not obtained within the two second time period, the coupling process is either aborted or repeated while maintaining the speeds of the vehicles.

For the purposes of this description, it is assumed that from now until the coupling process is completed, vehicle L will maintain a constant speed and direction and that all of the speed and steering variations will be performed by vehicle R. Of course, a similar process would occur if vehicle R maintains a constant speed and direction and all of the speed and steering variations will be performed by vehicle L. It is also possible to accomplish the coupling process if both vehicles are changing speed and directions. The critical aspects of the coupling process are the distance between the two vehicles, how this distance is changing with time in the process, and the angle of travel between the two vehicles.

The electronic control units now steer (in an all-wheel steering embodiment, the lateral movements will be controlled with a crab angle) vehicle R towards vehicle L with a steering (crabbing angle in an all-wheel steering embodiment) angle ranging from 2 to 5 degrees from straight ahead. Vehicle L still maintains a constant speed and direction. At typical distances of separation, vehicle speeds, and angles of approach, the time to contact will be approximately 5 seconds. The electronic control assemblies also calculate the horizontal and vertical adjustments of the harness to make proper alignment at the time of impact, the local electronic control unit makes the necessary adjustments, and then the motion of the harnesses is stopped by clamping the sides of the harnesses. To assist in alignment measurements, two additional cameras are located at each end of the coupler unit and focused towards the harness, and one additional camera is located above the harness and is focused down onto the harness. There are horizontal stripes marking the sides and top of each outer surface of each port. These stripes are monitored by the various cameras. The relative speeds are carefully regulated so that at the point of contact of the two coupler assemblies, there is a small but positive relative speed. The diameter of the locator pins is nominally 20 mm. Because these pins are tapered, they are self-centering so that the error of alignment can be as large as one cm. The energy of impact is absorbed by the springs within the harness assembly. These compressed springs also maintain the contact between the two couplers. The proper match is determined by the contact switches, which lie in the bottom of the receptacle well and are depressed by the corresponding pins from the other coupler. If the match is confirmed, the electromagnets are energized.

If the electronic control units determine that a match will not occur when the couplers are still, for example, 10 mm apart—in this case, start retracting the harness assembly at 0.1 m per second (100 mm per second) so that the contact point will stay slightly apart, but not touching, while at same time, commanding the speeds of both vehicles to have a small speed differential of approximately 0.02 m per second so that the couplers of the two vehicles start to move sideways or vertically using the active suspension as the case may be relative to each other in the direction of matching so that the tip of pin will fall in the range of the receptacle during this relative movements. As soon as this occurs, the match is accomplished, and the speed differential, the movements of the harnesses, and active suspension are nulled so that pin would go into the receptacles. Therefore, the precision of keeping the vehicles' speed precisely matched at any speed is not critical, because the couplers can be matched while the speeds of the two vehicles are different.

The doors to the electric port are now opened. The electrical plugs and electrical sockets are extended towards each other and the process of connection is monitored by internal cameras and LEDs. Once the electrical connection is made and confirmed, the mechanical ports, if present, are activated. Once completed, the two vehicles switch on their respective electrical circuits and are ready to start sharing electrical power as appropriate.

Once the electrical and/or mechanical ports are connected successfully, both harnesses of both vehicles retract back into their housings, pulling the two vehicles tightly to each other. As a consequence of this tightly coupling, the two vehicles are so tightly coupled that they travel and turn as a single larger vehicle (how to drive this configuration needs to be discussed in the sections of maneuvering the combined vehicle).

Problems in Coupling Process.

There are two issues that affects the success of the coupling process: A. the aiming accuracy to match the two couplers at the impact point to within the 10 mm position error and B. the vibration of the couplers themselves. Corrections in the aiming accuracy, which are greater than the allowed error are accomplished through precision modulation of each vehicle's speed, direction of travel through the active steering, and vertical motion through the active suspension. The vibrations, which represent perturbations and rotations in all three coordinate axes, should decrease in amplitude as the velocities and the weight of each vehicle increases. It is the lower frequency vibrations, which have the potential of having travel in excess of 20 mm. The slowest vibration will be compensated as described for the aiming accuracy. As the frequency increases to become greater than the response time of the steering and suspensions systems, the vertical and horizontal adjustments of the couplers within the harness assemble will be used to null the vibrations to less than the 20 mm error.

Uncoupling Process.

Once the decision is made to uncouple two vehicles, the process starts under automatic computer control. Both vehicles maintain their speed and direction. The harnesses of both vehicles now extend out to the halfway position. The electrical connections are switched off. The electrical ports disconnect and the electrical plugs and sockets are pulled back into their housings. The mechanical ports mow disengage by rotating the connection plug and withdrawing the plug into the housing. At this point in time, the only forces holding the two vehicles together are the electromagnets which are associated with the plugs and sockets of the coupler assemblies. These magnets are not energized, permitting the two vehicles to separate. In the fore and aft case, vehicle A decelerates to create a safe distance of separation of approximately 5 meters. In the side by side case, vehicle R steers away from vehicle L while both vehicles maintain the same speed. This continues until the two vehicles are travelling in parallel fashion and in their separate roadway lanes. At this point in the process for both cases, automatic computer control is disengaged, and the vehicles return to their normal driving mode.

Figure 9:
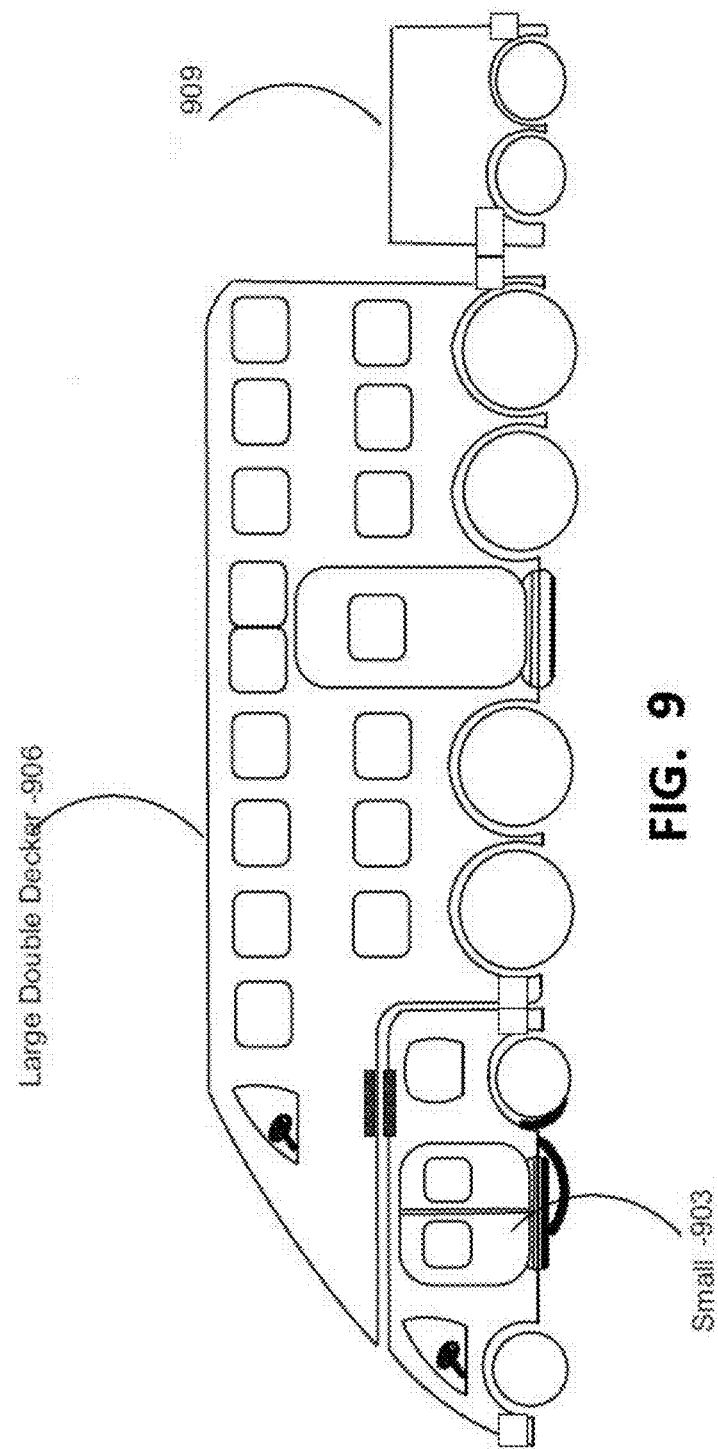
FIG. 9 shows a side view of a combination or cluster of vehicles, one small vehicle, one large vehicle, and one trailing vehicle.
Figure 10:
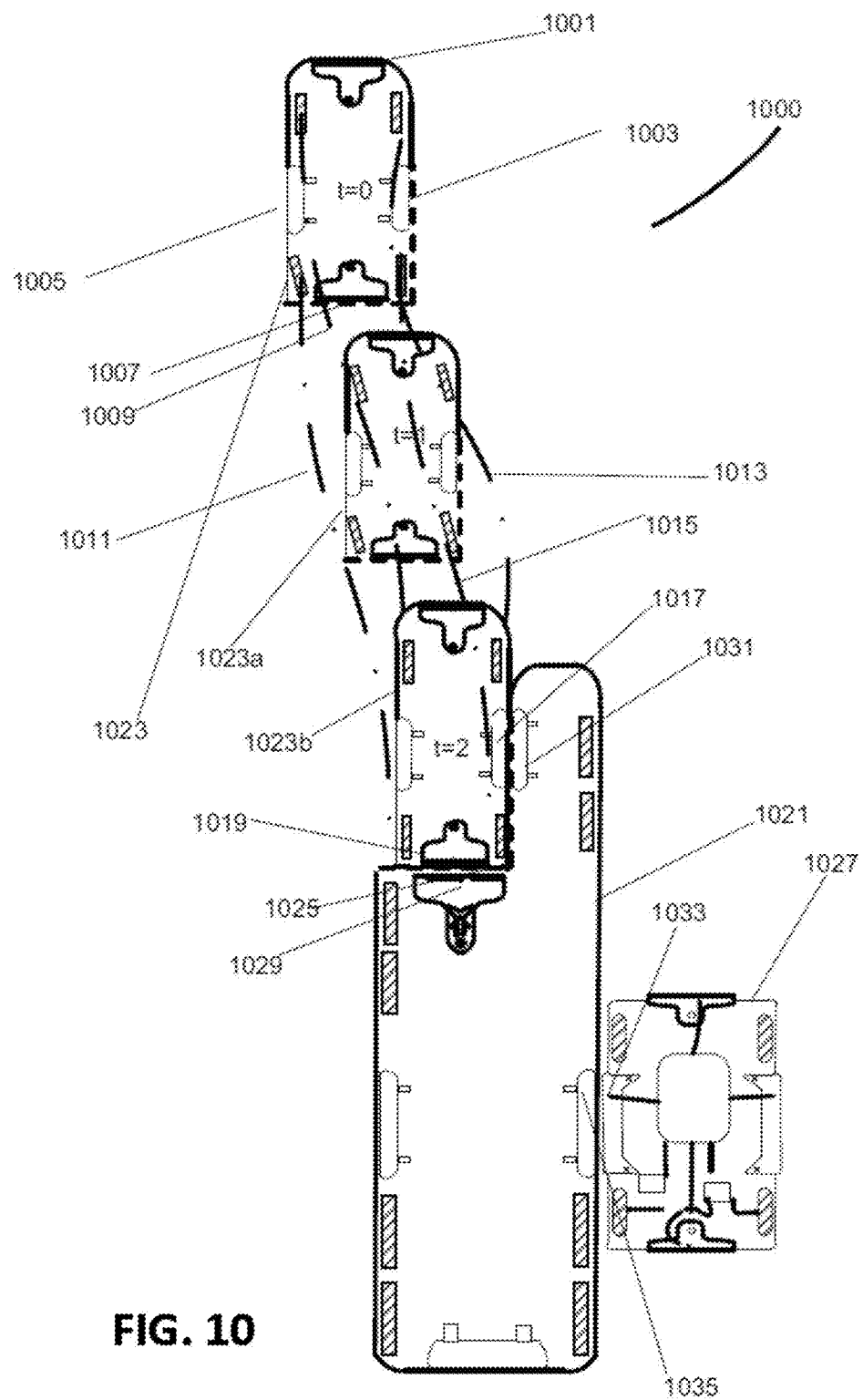
FIG. 10 is a schematic drawing to illustrate how the small and large vehicles, as illustrated in the previous figure, would join together.

With reference now to FIG. 9, an illustration of three different vehicles which are coupled together both electrically and mechanically will now be discussed. As shown in FIG. 9, the three vehicles from left to right are a small vehicle 903, a large vehicle 906, and a trailing vehicle 909 which is driverless. Because the two vehicles 903 and 906 are attached at two different locations, fore-and-aft and side-by-side, they are rigidly connected and act as a single vehicle even though their couplers may be flexible in construction. Vehicle 903 has two coupler assemblies located one on each side and under the side doors. One such coupler assembly is shown in FIG. 10 as 1035. Vehicle 903 also has two coupler assemblies which are not shown in FIG. 9 but are shown in FIG. 10 as 1031 and 1029. Depending upon the precise construction of vehicles 903 and 906, movement of passengers between these two vehicles may become possible. In this combined configuration, the trailing vehicle 909 main function is to supply energy to both vehicles 903 and 906 and 1027 which is visible in FIG. 10.

With reference now to FIG. 10, a schematic of how the small vehicle 903 would join with the large vehicle cluster 1021 of (906 of FIG. 9) will now be discussed. As shown in FIG. 10, while both vehicles may be in motion, the schematic is showing the relative positions between the vehicles. For purposes of continuity, vehicle 903 of FIG. 9 becomes vehicle 1023, and vehicle 906 of FIG. 9 becomes 1021 in FIG. 10. As further shown in FIG. 10, the large vehicle 1021 has previously made a lateral connection at its right rear side coupler 1035 with a smaller vehicle 1027 at the smaller vehicle's 1027 left side coupler 1033. Because of the difference in width between vehicle 1023 and vehicle 1021, the large vehicle 1021, will have an L cutout 1025 in its front left quadrant top to bottom, which will accommodate the small vehicle 023 at t=2 once the connection has been made. Specifically, the rear and one side of the small vehicle 1023 will make contact and connect with the large vehicle 1021. As a consequence of this configuration, the mating of these two vehicles will require the sequential connections at two different surfaces: between the right side coupler of the small vehicle 1017 and the large vehicle's left side coupler 1031 and between the small vehicle's aft coupler 1019 and the large vehicle's front coupler 1029.

For the purposes of this illustration, it is assumed that the vertical distance from the roadway to all of the connection points, both electrical and mechanical, are within tolerances. It is also assumed that the horizontal placement of the connectors on the small vehicle 1023 will match the horizontal placement of connectors on the large vehicle 1021 within tolerances. If this proves to be not possible, then independent short range horizontal and vertical adjustors will be added to the coupling assemblies on one or both vehicles. This is necessary as normal adjustments for a single point connection rely on steering and suspension changes. Steering and suspension changes would affect two point connections simultaneously. Furthermore, it is assumed that each vehicle is equipped with a plurality of sensor devices and inter-vehicle wired and wireless communication channels and subsystem capability. Lastly, it is assumed that both vehicles will be traveling on a smooth and straight road with no turns during the connection process.

To start the connection process, the lead vehicle, which is the small vehicle 1023, is driven so as to be in front of the large vehicle 1021, traveling on a parallel track with the large vehicle 1021 and traveling at the same speed as the large vehicle 1021. At this point in time [t=0], the small vehicle 1023 is approximately 2 meters in front of the large vehicle and is offset to the same side as is the opening in the front of the large vehicle 1021. Inter-vehicle communication is established if not done previously. The small vehicle 1023 is instructed to maintain its speed and straight line direction. All of the maneuvering will be performed by the large vehicle 1021.

FIG. 10 also illustrates the precise tracks relative to the position of vehicle 102 that the four wheels of the small vehicle 1023 will travel during the connection maneuver and are identified as follows: front right wheel track 1013, front left wheel track 1009, back right wheel track 1015, and back left wheel track 1011. Using the camera and LED combination, the positions of the coupler assemblies are determined. Once this communication is confirmed, the vehicles switch to automatic computer control. The large vehicle 1021 accelerates slightly and steers itself so the small vehicle 1023 is now ready to enter the slot of the large vehicle and is within a half meter of the side and front of the slot of the large vehicle 1021. This is time point=1, 1023b. The larger vehicle 1021 now matches the speed and direction of the smaller vehicle 1023b. Each vehicle locations the position of the corresponding target ports, and the electronic control assemblies calculate the approach angles and distances, which are shared between the two vehicles.

The larger vehicle now adjusts its speed and position so as to align the two lateral couplers. Once that is accomplished, the larger vehicle moves laterally towards the small vehicle so as to make contact with the two lateral couplers. This is time point=2. Once successful contact is made, the ports open up and lock on each other. Once the two lateral couplers are tightly connected, the aft coupler on the small vehicle and the fore coupler on the larger vehicle extend towards each other. Once these two couplers are in physical contact, the ports open up and lock on each other.

To separate the two vehicles, the small vehicle 1023b resumes independent control. The electrical connectors are separated, and the mechanical connections are separated first within the fore and aft couplers and then within the lateral couplers. The small vehicle 1023 simultaneously slightly accelerates and steers away from the large vehicle at an approximate 45 degree angle from the direction of motion of the large vehicle. Once the distance of separation of the coupling surfaces is greater than two meters, the small vehicle 1023 further accelerates to get clear of the large vehicle 1021. Once the small vehicle 1023 is clear of the large vehicle 1021, it proceeds on its master path plan.

Navigation of Coupled Vehicles Around a Turn.

Figure 11:
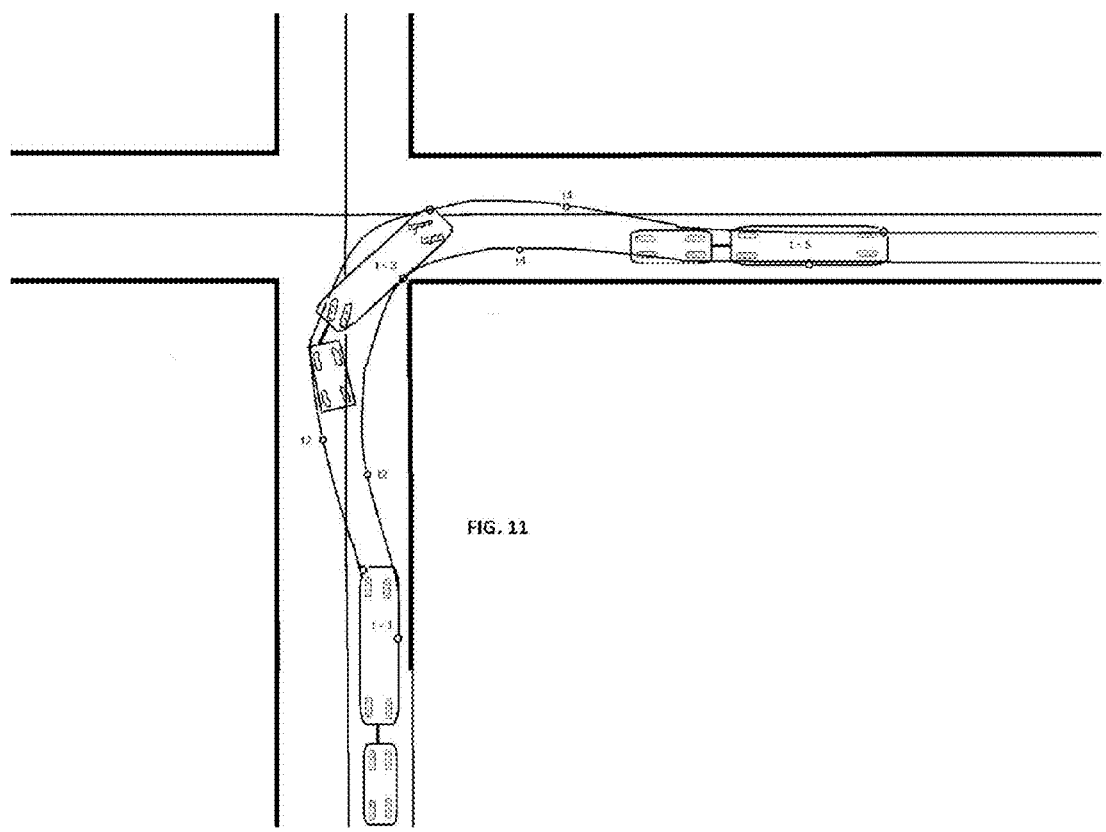
FIG. 11 is a schematic drawing to illustrate how a two vehicle cluster would navigate a 90 degree right turn.

With reference now to FIG. 11 a schematic drawing to illustrate the path that a cluster of two combined vehicles which are articulately coupled would take to navigate through a 90 degree right turn will now be discussed. As shown in FIG. 11, each wheel of both vehicles described herein will have the capability of maximum steering angle of thirty degrees. For illustrative purposes, consider the lead vehicle to be 8 meter long by 2.5 meters wide and the trailing vehicle to be 3 meter long by 2 meters wide. The two vehicles are connected by the previously described harness. This harness has the capability of shortening or extending the separation of the two vehicles. In this figure, t0, t1, t2, t3, and t4 represent the position of the two vehicles at the time before the turn, the time at the beginning of the turn, the time at the middle of the turn, the time at the ending of the turn, and the time once the vehicles are traveling in the new direction, respectively. It is assumed that this maneuver is performed at slow speeds, e.g. less than 20 mph. Two tracks are presented in FIG. 11. The left hand track, labeled "L", is the track that the front left corner will travel. If the wheels are placed at the corners of the vehicles, this would also represent the track that the left front tire would follow. The right hand track, labeled "R", is the track that "M", which is midpoint on the right side of the vehicle would follow. These positions are shown in the figure. The drawings of the vehicles labeled "A", "B", and "C" represent the positions at t0, t3, and t5 respectively.

For the purposes of the following calculation and since the larger vehicle has multiple wheels, the wheelbase midpoint will be the position in the vehicle which is halfway between the foremost wheels and the rearmost wheels. Now extend that position to the right side of the vehicle for a right hand turn. We will label that position on the right side of the vehicle as "M". The positions of this position are shown as small squares in FIG. 11. Each road turn will have a point which would be the common intersection point of lines perpendicular to a vehicle's centerline. This will be labeled as the turning center point. The precise track or path that each wheel must travel to negotiate the turn is calculated by the electronic control units and is determined by the angle each wheel can turn, which is 30 degrees in this embodiment, the wheelbase distance between the front and rear wheels of the vehicle with the larger wheelbase, which is vehicle 1021 of FIG. 10, and the distance between the position "M" on the larger vehicle and the turning center point. These calculations give a radius of curvature for the turn. For this particular example of 30 degree turning of the wheels, the radius of curvature is equal to the wheelbase. Using the calculated radius of curvature, the position at a particular time of two different points on the vehicle can be calculated. For FIG. 11, the position of the front left wheel and the midpoint "M" are shown as an example of two possible points. Two points are sufficient to determine the unique position and turning angle of every wheel because of the rigid vehicle frame. The listing of these positions, angles, and times become the set of steering commands which are shared between the two vehicles and are executed by each one.

At time t0, the leading vehicle determines if the location of other nearby vehicles will permit the additional space which is required for the turning of this size vehicle. This would occur via driver's observation, vehicle sensors and inter-vehicle communication. Once the space has been determined to be available, the harness will extend and increase the separation of the two vehicles, and the lead vehicle, will begin the turn by turning its wheels to the left. Once in position for the turn (t2), the wheels are fully turned to the right. At the midpoint in the turn (t3), the lead vehicle will be at an angle of 45 degrees relative to the original direction of travel, and position "M" will be touching the corner on the turn. The second vehicle, is following the track of the lead vehicle. Since the harness is at its maximum length of separation, the two vehicles can continue to be connected even though there is an angle of 60 degrees between the front of the second vehicle and the rear of the leading vehicle. As the turn is almost completed (t3), the lead vehicle is almost on the new track while the second vehicle is still completing its turn. Once both vehicles are finished with the turn (t4), the harness shortens the inter-vehicle distance to the standard distance of separation for straight line traveling, and the two vehicles continue to follow their master path plan. For two vehicles which are tightly coupled, they must travel as a single unit. As a consequence, a greater radius is required for such a turn wherein the front wheels of the leading vehicle and the rear wheels of the trailing vehicle will follow this radius.

Track Guide Member.

Figure 12:
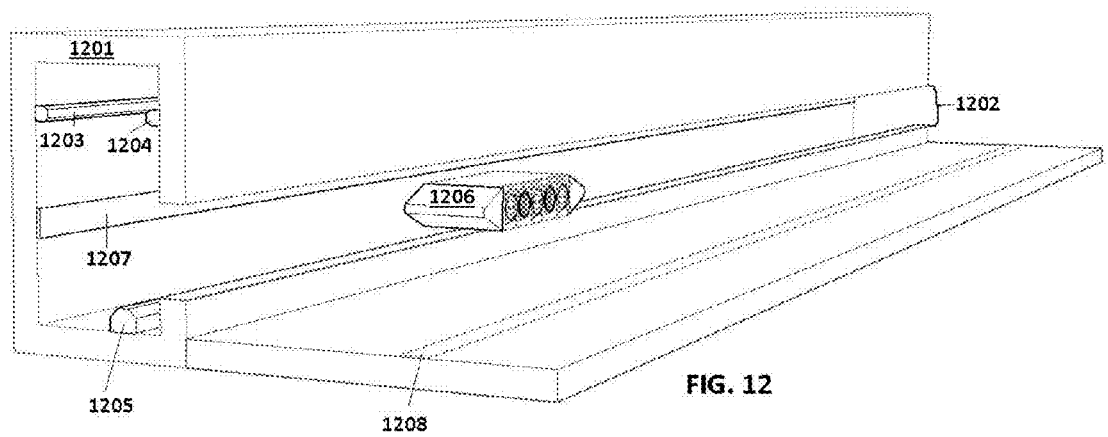
FIG. 12 is a schematic drawing to illustrate the operation of a guide member for a grid energy supply mode and/or a track-guided mode of operation.

According to a preferred embodiment of the present invention a Roadway guide member may use the lateral coupling to provide both the mechanical connection which is especially useful in a bad weather situation as well as electrical power connections will now be discussed. Preferably, this guide member is a low profile, in contrast to a (i.e., not pantogram which is a rooftop antenna-like electric connection, structure that can take the place of the concrete divider that is in general use today ranging in distances from at least a mile to up to 200 miles during which time the connected vehicles are charged via the guide member from the grid. With reference now to FIG. 12, a schematic drawing to illustrate the operation of a guide member for a grid energy supply mode and/or a track-guided mode of operation will now be discussed. As shown in FIG. 12, the guide rail system consists of a very long and sectioned "C" shaped concrete and steel tube (1201) with a continuous slot opening (1202) on one side (the road side). Within the C-Tube tube is located a two (or one-) wheeled (self-propelled with electric motor) motorcycle framed driver-less vehicle (not shown) with two lateral support wheels running on the top half of the concrete wall of the C-Tube. These support wheels can be tired wheels or tracked steel wheels (running on the two tracks are marked as 1203 and 1204 in FIG. 12) or even motorized geared wheels when used on a graded slope for a greater traction). The self-propelled wheels of the guide member vehicle runs on the single track 1205 in the bottom of the C-tube. The guide member vehicle which has a standard lateral coupler unit 1206 which projects through the slot (1202) and extends out (this extension can be fixed (not motorized), motorized half or motorized full, i.e.,) a sufficient distance so that another vehicle can connect to it laterally side-by-side. The height of the coupler as measured from the roadway surface to its bottom surface is same as the ground clearance of a road vehicle, nominally at 200 mm or ~8 inches. As shown in FIG. 12 with 5 connector ports, M-E-M-E-M with a wind shroud cover in the front and rear for air dynamics as well as housing a coupler support and extender mounting harness. (Three or four port numbers can also be supported). The leading and trailing edges of the coupler are fitted with a wedge shaped surface to act as a windshield to make the coupler more aerodynamic. The tube wall together with the lateral support wheel of the guide member provides the steering path (track guidance) for the two-wheeled vehicle as well as an embedded electrical connection to the electric grid. When another vehicle makes connect with the two (or one-) wheeled vehicle, this connection provides electrical power and steering path to the connected road vehicle. The road vehicles when connected to the guide member vehicle are now operating in a track-guided mode. The guide member can also be deployed on the other side of the road (the right shoulder in the US), especially when there is no center division (i.e., not a divided highway). The guide C-tube run whether in the center or side can be segmented into sections, between exits or turns. The guide member being self-propelled can be employed (connecting or disconnecting) at highway speed with sensors and cameras.

According to aspects of a preferred embodiment, the present invention may include a passenger transferring platform linkage. The passenger transferring platform linkage may be designed to allow passenger movement between vehicles during transit. Preferably, this may be an automatically open able linkage between the vehicles when the road conditions are ideal for safe operation of this linkage. For large bus-like vehicles a side-transfer can be designed to allow more people to quickly go to a different vehicle. Again, the precise virtual track management is essential in executing this design.

Preferably, the vehicle Transportation System of the present invention is designed for maximum efficiency through intelligent control and optimization through the onboard sensors and data connection linkages. A cloud control management system would optimize the utilization of the system, but the vehicle transportation may operate independently of such a system. Through the communication linkages and technology of the present invention transportation costs may be drastically reduced while increasing vehicular capacity, velocity and efficiency without building new infrastructure, guide ways or track. The innovative communication-based turnkey signaling solutions built on modern data communication systems feature wireless communication of movement authority that can either overlay on an existing system or be installed as complete new signaling system, improving safety through full automatic and on-board displays.

Vehicle to Vehicle Communication and Virtual Tracks.

There is wired data connection in the linkages between all vehicles in a combined vehicles and/or combined vehicle clusters plus sophisticated on-board vehicle computers. Following a precise virtual track or path requires communication between an on-board computer with the leading vehicle and the other vehicles in the cluster.

Together with other distance and speed feedback sensors (GPS, vision, microwave (RADAR), ultrasound, etc.), the onboard computer/controller lead vehicle of a combined vehicles and/or combined vehicles clusters in possible communication with the cloud management system can calculate virtual track, which all vehicles in the cluster must follow. This virtual track provides information communicated from a lead vehicle to a following vehicle indicating subsequent positions based on time, speed, and orientation. This track is communicated to all the trailing vehicles of the combined vehicles and/or combined vehicles clusters for them to traverse and follow precisely. Preferably, the virtual track may contain precisely precomputed time and position points for each T vehicle in the combined vehicles and/or combined vehicles clusters resulting in very little lateral and longitudinal Internal Sensors.

Internal sensors of the present invention may include but are not limited to the following: 1) GPS Based Methods offer position readings from vehicles equipped with GPS are used to compute vehicle speeds. Modern methods may not use dedicated hardware but instead Smartphone based solutions using so called Telematics 2.0 approaches. 2) On-board webcams to provide visual information similar to what the human systems of drivers or passengers can detect such as external road conditions (static blockages, e.g., fallen trees or rocks, traffic signals, signage, etc.) and surrounding moving traffic (other vehicles, including bicycles), pedestrians and animals as well as internally (inside the cabin) to assist the detection of passenger and luggage status for the purpose of enforcing the personal safety of each passenger. 3) Wireless communication and radio modem communication on UHF and VHF frequencies. 4) Bluetooth is an accurate and inexpensive way to measure travel time and make origin/destination analysis. Bluetooth is a wireless standard used to communicate between electronic devices like mobile/smart phones, headsets, navigation systems, computers etc. Bluetooth road sensors are able to detect Bluetooth MAC addresses from Bluetooth devices in passing vehicles. If these sensors are interconnected they are able to calculate travel time and provide data for origin/destination matrices.

The in-vehicle eCall is an emergency call generated either manually by the vehicle occupants or automatically via activation of in-vehicle sensors after an accident. When activated, the in-vehicle eCall device will establish an emergency call vehicle carrying both voice and data directly to the nearest emergency point (normally the nearest E1-1-2 Public-safety answering point, PSAP). The voice call enables the vehicle occupant to communicate with the trained eCall operator. At the same time, a minimum set of data will be sent to the eCall operator receiving the voice call. The minimum set of data contains information about the incident, including time, precise location, the direction the vehicle was traveling, and vehicle identification. Depending on the manufacturer of the eCall system, it could be mobile phone based (Bluetooth connection to an in-vehicle interface), an integrated eCall device, or a functionality of a broader system like navigation, Telematics device, tolling device.

In addition to the precise location of each vehicle in the system, passengers vehicle carrying smart cell-phone like devices may be connected to the system, so that their locations (for the purpose of making safe and orderly transfer between vehicles in a combined vehicles and/or combined vehicles clusters) and their intended destinations may be communicated to the computerized cloud management system. With these data available to the system, the travel of each passenger in the system can be efficiently planned and managed in terms of which vehicle in which combined vehicles and/or combined vehicles clusters that each passenger should get on or transfer to in a timely, orderly and safe manner. Information regarding the above can be displayed in succinct easy to follow graphics assisted with a personalized voice command if necessary. To make sure that such device will have power all the time, the cabin of all vehicles may be equipped with a battery charger.

With this system, these vehicles would serve as low-cost but extremely personalized mass transit system. A suburban commuter can expect to have a vehicle waiting at the door at the time that he or she prescribes with the special cell phone and know very precisely the ETA at his or her chosen destination. They can also expect that the journey would entail no waiting or stopping for another vehicle pooler/rider as the vehicle pooling would be automatically arranged through the system. They can also expect that there is no need for them to concentrate on driving. With internet availability in every vehicle, passengers can use the Internet for business or pleasure during the ride. Most importantly, they can expect that the journey to be free of traffic jam and delay.

On-Board Computer or Electronic Control.

A computer module with hardware memory management and Real-Time Operating Systems allowing for more sophisticated software applications to be implemented, including model-based process control, artificial intelligence, and ubiquitous computing. It will also have a watchdog program, which will constantly monitor the operation of the vehicle to check for correct operation. An on-board computer may implement autonomous driving modes based on individual vehicles specific performance levels when receiving location, speed and time data from the computerized cloud management system.

External Sensors.

External sensors of the present invention may include but are not limited to the following: 1) Distance measuring sensors may include radar, IR (the kind that used in digital cameras to measure distance for focusing purposes) and simple mechanical (e.g., optical encoders) video camera, short distance radar, or short distance infrared. 2) Three dimensional sensors on wheels and external module housing. 3) Sensors embodied in the linkage between-vehicles.

Preferably, the external sensing system of the present invention enables vehicle situational awareness to occur automatically in response to a radar sensor or camera that detects acceleration or deceleration of other nearby vehicles. Thereby enabling safety features such as active cruise control, blind-spot detection, lane departure warning, pre-crashing sensing, or parking slot measurement and reversing aid.

Conventional Vehicle Retrofitting.

When this system of auto driving vehicles is in its initial implementation, the vehicles may have to coexist with conventional vehicles on the same roadway. One solution to address the issues of combining human drivers with the other auto-driving vehicles is to have conventional vehicles retrofitted with the following components: cloud computer controllable vehicle braking retrofit; cloud computer controllable vehicle acceleration retrofit; and cloud computer controllable vehicle steering retrofit.

While the above descriptions regarding the present invention contains much specificity, these should not be construed as limitations on the scope, but rather as examples.

We claim:

1. A transportation system which includes a plurality of vehicles which can be coupled under computer control to permit the variable and flexible bidirectional distribution and sharing of electrical energy, the system comprising:
- a coupling system, wherein each of a plurality of vehicles is equipped with at least one coupler unit, wherein each coupler unit comprises:
  - at least one electrical power connection port through which the computer controlled connection can be made; further wherein, each of said coupler units is mounted on mutually compatible, approachable and connectable positions on the vehicles; further wherein, the coupling and uncoupling process can be made under combined vehicle computer control of the vehicles to be coupled while travelling;
- a system of power distribution units wherein each of a plurality of vehicles is equipped with a power distribution unit (PDU) for distributing electrical power;
- a communication system wherein each vehicle is equipped with a plurality of inter-vehicle communication channels and subsystems wherein each vehicle has broadcasting, reporting and information exchange capabilities with other vehicles either directly or via a wide area network mechanism;
- a system of electronic control units wherein each of the plurality of vehicles is equipped with an electronic control unit for initializing, managing and controlling the following functions: automatic initial stage coupling and uncoupling, intra- and inter-vehicle energy sharing, power distribution, routing, switching and storage modes, and combined driving modes and operation of coupled vehicles;
- an on-board electrical supply and storage device to be shared; and
- an extra-vehicle marking sensors subsystem further comprises a plurality of extra-vehicle markings and corresponding sensors to allow the electronic control unit based on these sensor outputs to identify markings on the external vehicle frame near an approaching location.

2. The transportation system of claim 1, wherein the at least one coupler unit uses electro-magnetic forces to hold and lock the at least one electrical port.

3. The transportation system of claim 1, wherein the at least one coupler unit further comprises subunits of polarized matching and keyed contact interface surfaces that are expandable with different sizes, which are compatible and can be mated together.

4. The transportation system of claim 1, wherein the at least one coupler unit is characterized as having:
   a. at least one subunit of polarized matching and keyed contact interface surfaces that are expandable with different sizes and which are compatible and matchable;
   b. at least one contact surface that is brought into contact with an opposing contact interface surface of the approaching coupler unit of the connecting vehicle;
   c. one or more subunits of contact interface surfaces of two opposing and matching polarized types;
   d. a contact interface surface consisting of two or more of the polarized matchable subunits, the subunits are spaced in equal distances in both vertical and horizontal wherein a contact interface surface having a smaller number of subunits can match its opposing contact interface surface having a larger or an equal number of subunits in a centered or a number of off-centered positions;
   e. a plurality of contact sensors on the contact interface surface of the coupler unit to detect whether the two surfaces have come into the closest and exactly-matching contact;
   f. a plurality of location and position markers on the contact interface surface; and
   g. a plurality of sensors on the contact interface surface to detect and locate the positions markers.

5. The transportation system of claim 1, wherein the at least one electrical port (E-port) comprises:
   - at least one set of cabling configured to make connection between an electrical plug or an electrical receptacle and the power distribution unit;
   - a plurality of pressure sensors to detect how tightly a male port surface and a female port surface are connected to each other;
   - a plurality of optical sensors and marking locations on the surfaces to determine the alignment between the male port and the female port; and
   - a local electronic control unit to detect the degree of alignment and to send signals to the drive wheels to alter both horizontal and vertical position to optimize correct alignment and to control the movement of the electrical plug or electrical receptacle; wherein, if the subunit contact interface surface is the female, a door can be opened under computer control to allow the electrical receptacle to extend towards the mating surface; further wherein if the subunit contact interface surface is the male, a door can be opened under computer control to allow the electrical plug to extend towards the mating surface to make contact with the electrical receptacle to electronically connection and disconnect.

6. The transportation system of claim 1, wherein the on-board electrical supply and storage device is an on-board battery.

7. The transportation system of claim 1, wherein the power distribution unit (PDU) of a vehicle comprises a plurality of computer controlled switching and routing modes including:
   - an internal power mode wherein at least one set of second collective end points are switched to connect to at least one set of first collective end points so that an energy storage device provides power to turn at least one traction motor in a vehicle's driving phase and receives power in a vehicle's deceleration phase, when at least one vehicle traction motor is switched into an electric generator mode to re-charge the battery in order to recover some energy;
   - an external power mode, wherein at least one set of the first collective end points is switched to connect to one of the points in a set of intra-vehicle endpoints, so that an extra-vehicle power supply provides power to turn at least one traction motor of a first vehicle in the driving phase or receives power in the deceleration phase;
   - an external charging mode, wherein at least one set of second collective end points are switched to connect to one of the points in the set of intra-vehicle endpoints, so that the extra-vehicle power supply provides power to charge an intra-vehicle storage device; and
   - a relay mode, wherein at least one set of the intra-vehicle end points from different couplers on a first vehicle can be switched to interconnect to one another so that a second and a third vehicle are configured to connect to the first vehicle.

8. The transportation system of claim 7, wherein the coupler unit serves additionally as a charging port of an electrical vehicle; wherein the relay mode allows the number of charging stations slots to be increased without physically providing more charging connectors.

9. The transportation system of claim 7, wherein the on-board electrical supply and storage device is additionally an electrical power generator with its electrical output connected to an auxiliary power supply endpoint of a power providing circuit switching and routing unit.

10. The transportation system of claim 1, further comprises a plurality of mechanical port subunits (M-port), each of the plurality of mechanical port subunits is characterized as having:
- a plurality of pressure sensors to detect how tightly the male and female port surfaces are connected to each other;
- a plurality of optical sensors and marking locations on the surfaces to determine the alignment between the male port and the female port;
- a local electronic control unit to detect the degree of alignment and to send signals to the drive wheels to alter both horizontal and vertical position to optimize correct alignment and to control the movement of a mechanical rod in the mechanical port subunit wherein if the subunit contact surface is the female type, a channel that can be opened by retracting the mechanical rod under computer control to allow a mechanical rod from the mated subunit on the contact interface surface of the opposing coupler unit to pass through to reach a locking position and further wherein if the subunit contact interface surface is the male type, a mechanical rod that can be pushed through the channel to reach the locking position whereupon a locking mechanism can be activated to lock the mechanical connection;
- a tightening mechanism used to tighten the lock to a pre-determined amount of tightness upon locking the mechanical connection during mechanical connecting;
- a plurality of sensors to sense the contact status of the mechanical port including sensors to detect whether the locking position is reached and how much tightening force is used.

11. The transportation system of claim 1, wherein the at least one electrical port and the at least one mechanical port are arranged in different sequences within the at least one coupler unit to allow for multiple and simultaneous connections and to allow for alternative positioning of an opposing at least one coupler unit which has a different number and arrangement of electrical and mechanical ports.

12. The transportation system of claim 1, wherein if two vehicles are to be coupled fore and aft, the front vehicle (vehicle #1) will have a rear coupler unit attached to the rear of the vehicle #1, and the rear vehicle (vehicle #2) will have a front coupler unit attached to the front of the vehicle #2; if a third vehicle (vehicle #3) is to be coupled to the two vehicles described above and specifically to vehicle #2, vehicle #2 will now have a rear coupler unit attached to the rear of vehicle #2 and vehicle #3 will have a front coupler unit attached to the front of vehicle #3; if two vehicles are to be coupled laterally side by side, the left vehicle (vehicle #4) will have a right lateral coupler unit attached to the right side of vehicle #4, and the right vehicle (vehicle #5) will have a left lateral coupler unit attached to the left side of vehicle #5.

13. The transportation system of claim 12, wherein the transportation system further comprises a road-side low profile, concrete and steel infra-structure, in which an electrical power grid connecting and driverless, track-guided guide-member vehicle equipped with a laterally situated couple unit operates to provide both mechanical guidance support and electrical energy transfer to a connected vehicle that has a corresponding and matching lateral coupler unit that can couple with said guide-member vehicle.

14. The transportation system of claim 1, wherein each vehicle further comprises at least one vehicle external approachable location located at a standardized height at or below bumper level or below the side door for mounting the coupler unit.

15. The transportation system of claim 14, wherein the coupler unit comprises an articulated mounting harness for mounting the coupler unit on the at least one vehicle external approachable location on each vehicle; wherein the articulated mounting harness is configured with a plurality of force and position sensors to detect any straining forces and position offsets positional deviations that may be present due to misalignment of the bodies frames of the two connecting and moving approaching vehicles.

16. The transportation system of claim 14, wherein the extra-vehicle marking sensors subsystem further comprises a plurality of extra-vehicle markings (homing beacons) and corresponding sensors to allow the electronic control unit based on these sensor outputs to identify markings on the external vehicle frame near the vehicle external approachable location.

17. The transportation system of claim 1, wherein the coupler unit further comprises a stand-alone but connectable receptacle format changer to serve as an adaptor between two vehicles on two sides of its contact interfaces surfaces in order to serve the functions of polarity changer, electrical plug and receptacle format changer or physical width and length extender.

18. The transportation system of claim 1, wherein the coupler unit serves as a charging port for an electrical vehicle.

19. The transportation system of claim 1, wherein the at least one coupler unit serves as a charging plug in an electric vehicle charging station; wherein the at least one coupler unit is configured for mating with at least one charging station's coupler unit either in semi-autonomous mode or in full-autonomous mode for charging.

20. The transportation system of claim 1, wherein each vehicle further comprises an active suspension subsystem to provide vertical adjustment of the coupler units to further assist the mating of coupler units between vehicles.

21. The transportation system of claim 1, wherein the coupler unit further comprises a flat, rigid horizontal top surface which can serve as a walk-on platform for a passageway between the doors of the connected vehicles.

22. The transportation system of claim 1, wherein the on-board electrical supply and storage device is additionally a roadway electric power supply line pickup system connected to an auxiliary power supply end point of a power providing circuit switching and routing unit; wherein the pickup system is selected from the group of pickup systems comprising: a roof top pantograph supply line pickup unit, a third rail electrical power supply line pickup unit, and a ground-level electrical power supply line pickup unit.

\* \* \* \* \*